US011068329B2

(12) United States Patent
Melanchenko

(10) Patent No.: US 11,068,329 B2
(45) Date of Patent: *Jul. 20, 2021

(54) ALERTING SYSTEM HAVING A NETWORK OF STATEFUL TRANSFORMATION NODES

(71) Applicant: salesforce.com, inc., San Francisco, CA (US)

(72) Inventor: Dmytro Melanchenko, Trinity, FL (US)

(73) Assignee: salesforce.com, inc., San Francisco, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 16/298,285

(22) Filed: Mar. 11, 2019

(65) Prior Publication Data

US 2019/0205199 A1 Jul. 4, 2019

Related U.S. Application Data

(63) Continuation of application No. 15/291,858, filed on Oct. 12, 2016, now Pat. No. 10,275,298.

(51) Int. Cl.
*G06F 11/07* (2006.01)
(52) U.S. Cl.
CPC .................. *G06F 11/0772* (2013.01)
(58) Field of Classification Search
CPC .............. G06F 11/0772; H04L 63/1408
See application file for complete search history.

(56) References Cited

U.S. PATENT DOCUMENTS

| | | | | |
|---|---|---|---|---|
| 7,958,497 B1* | 6/2011 | Lindo | .................. | A63F 13/497 717/128 |
| 10,116,675 B2* | 10/2018 | Brown | ................ | H04L 63/1425 |
| 10,275,298 B2* | 4/2019 | Melanchenko | ..... | G06F 11/0772 |
| 10,437,831 B2* | 10/2019 | De-Levie | ............ | H04L 63/1425 |
| 2010/0125574 A1* | 5/2010 | Navas | ................ | G06F 16/2255 707/722 |
| 2015/0120905 A1* | 4/2015 | Leogrande | .......... | H04L 41/0681 709/224 |
| 2017/0091038 A1* | 3/2017 | Whitner | .............. | G06F 11/2038 |

* cited by examiner

*Primary Examiner* — Nadeem Iqbal
(74) *Attorney, Agent, or Firm* — LKGlobal | Lorenz & Kopf, LLP

(57) ABSTRACT

An alerting system is provided that includes a network of transformation nodes, and state change processors. The transformation nodes include input transformation nodes, output transformation nodes, and intermediate nodes that connect the input and output transformation nodes. Each input transformation node can receive an events stream, and is coupled to one of the output transformation nodes by one or more intermediate transformation nodes. Each transformation node (except the input transformation nodes) can receive state updates from those transformation nodes that it subscribes to. Each output transformation node can generate a check result when stored state information for each of the transformation nodes that the output transformation node subscribes to collectively indicates that the check result should be generated. Each output transformation node is coupled to one of the state change processors that can determine whether the check results should trigger an action, and if so, can then perform an action.

18 Claims, 15 Drawing Sheets

US 11,068,329 B2

ALERTING SYSTEM HAVING A NETWORK OF STATEFUL TRANSFORMATION NODES

CROSS-REFERENCE TO RELATED APPLICATION

This application is a continuation of U.S. application Ser. No. 15/291,858, filed Oct. 12, 2016, which is incorporated herein by reference in its entirety.

TECHNICAL FIELD

This disclosure relates to alerting systems and methods used to monitor events streams, and more particularly to alerting systems and methods that include a network of transformation nodes used to monitor events streams and implement checks that trigger actions.

BACKGROUND

As a server system of an organization or company grows, at some point its personnel cannot monitor every single server, and every single stream of events from every server. As such, software-based alerting systems are important to help monitor such server systems.

Traditional software-based alerting systems can monitor streams of events and notify people when something significant has happened. In traditional software-based alerting systems, formalized check expressions (or "checks") are periodically executed against various data sources. These data sources are usually time series databases, events logs, etc. Based on checks against the various data sources, alerts can be triggered. For example, in some alerting systems, each check is a query to one or more of the data sources and a threshold. If a check result matches or meets a threshold, then the alerting system generates an alert, and sends it to a consumer (e.g., an email or SMS address, a self-healing system, or other receiver). Ideally, alerts should be generated quickly so that a system or personnel can react faster and address issues that caused the alert to be generated.

Each new query from an alerting system to verify a check is processed the same way as any other request to the system: a small subset of data is extracted from a much bigger data set, the extracted data is transformed according to the query, and a result is returned for threshold checking. Because subset of data involved is many times smaller than the overall amount of data stored in the events storage system it takes some time to extract that data and process it. Moreover, every time the check is performed all the processes of searching, extraction and transformation will be repeated even if nothing has changed since the last run of that check. This approach is unnecessarily resource intensive and inefficient.

As the number of event streams and events continues to grow, the number of stored events streams and number of alerts also continue to increase. This challenges the scalability of the storage and computational layers of the alerting system. As amount of data and checks grows, the storage and computational layers should still run a checks cycle with the same frequency to keep meeting alerting latency requirements. It means each check must be performed faster.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
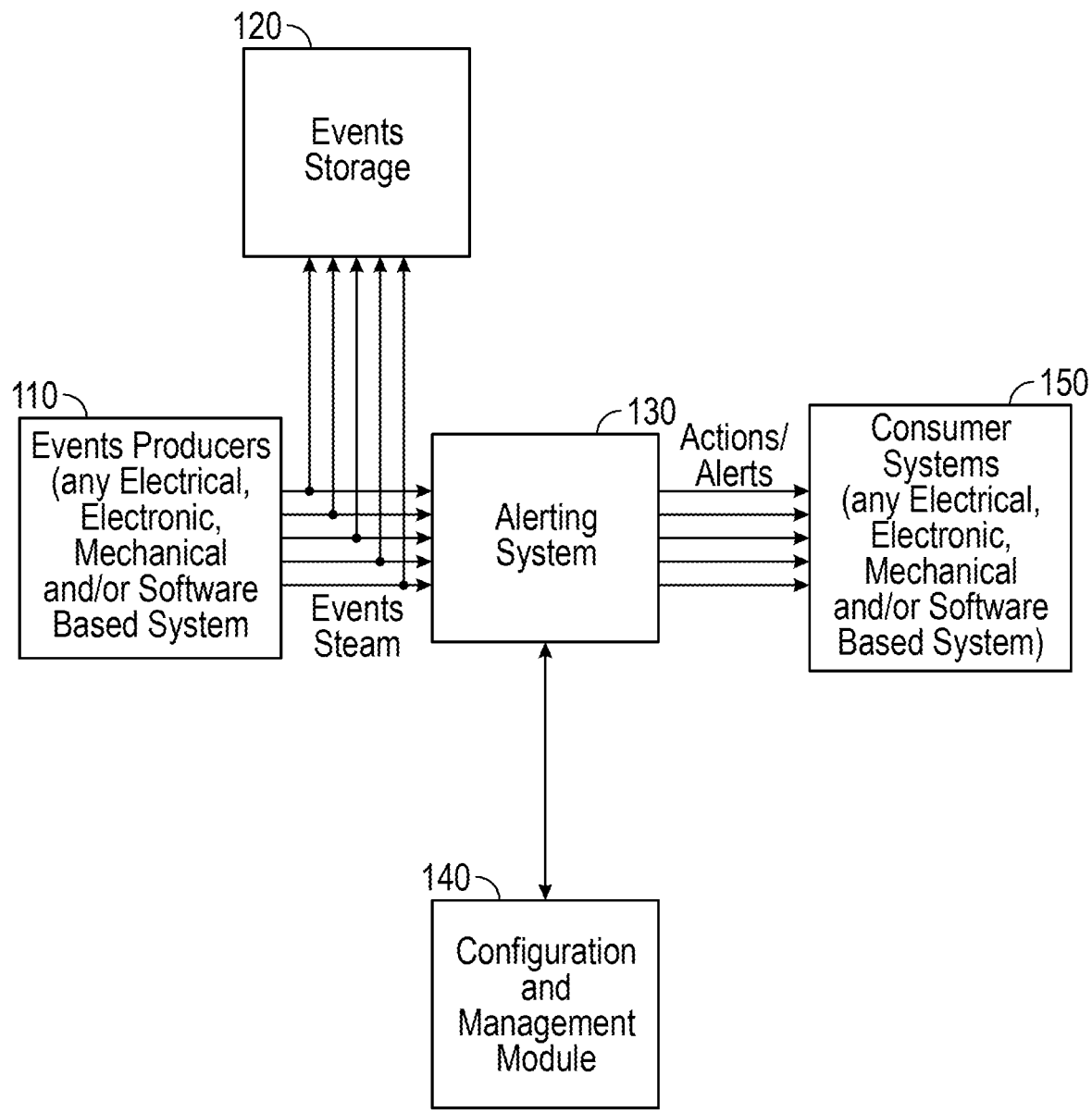
FIG. 1 is a block diagram illustrating a computing environment according to an embodiment.

As noted above, traditional alerting systems run checks periodically against pre-stored data, and every check is computed every time even when nothing has changed since the last run. If something changes, the alerting system will only get to know about the change after some delay, and cannot catch changes earlier than the next time at which that check is scheduled to run. Another drawback of conventional alerting systems is that these alerting systems are inefficient because every check is run or computed at fixed intervals even when nothing has changed every time without any real motivation for doing so. The same calculations are repeated even if they were done earlier on the same data but for the different check. Another drawback of traditional alerting systems is that they run all checks in isolation (i.e., as if all analysis is based on a single check only). Such systems cannot make complex decisions based the results of several checks, or information used to perform those checks.

To address the drawbacks associated with traditional alerting systems and methodologies, the disclosed embodiments can provide an alerting system that is used to implement a number of checks, where each check is "pre-wired" in the system as a combination of transformation nodes and connections between those transformation nodes. The alerting system includes a network of transformation nodes that each store state (or state information), subscribe to other nodes, and have other nodes subscribed to it. Throughout the description, the terms "state" and "state information" can be used interchangeably depending on the context.

In accordance with the disclosed embodiments, a "check" can refer to a formula defined by a path that includes a particular combination of transformation nodes linked together with at least one of the transformation nodes being an input transformation node that is coupled to an events stream. Each transformation node has a formula associated with it. A formula for a particular transformation node is an expression that describes how the output(s) of other transformation node(s), that the particular transformation node subscribes to, are to be processed using a particular transformation rule (or transformation function) for that particular transformation node. As such, the formula for a particular transformation node takes into account the formulas and transformation rules for all transformation nodes that the particular transformation node subscribes to. As a result, the formula, which describes each check includes by association the formulas of all transformation nodes in the path that defines the formula for that check. Therefore, the check can be broken down into minimal operations, where each of the operations corresponds to a transformation rule implemented in a separate transformation node and arguments for the operation are implemented in subscriptions to other transformation nodes that the transformation node established, and where the results of each operation are stored in or at each separate transformation node. Thus, for each check, the alerting system does not need to recompute a full formula for that check every time input events stream(s) change or on schedule. By contrast, traditional alerting systems recompute full formulas either on every input change or by schedule or on demand, but do not store and reuse intermediate results of computations to reuse them later.

Each check can be represented as an isolated, directed acyclic graph (DAG). As used herein, a directed acyclic graph is a finite directed graph with no directed cycles. A DAG consists of many finite vertices and edges, with each edge directed from one vertex to another, such that there is no way to start at any vertex and follow a consistently-directed sequence of edges that eventually loops back to the vertex again. Equivalently, a DAG is a directed graph that has a topological ordering, a sequence of the vertices such that every edge is directed from earlier to later in the sequence. No two vertices in the graph can be connected with more than one edge directly. In accordance with the disclosed embodiments, vertices of the DAGs have transformation rules assigned to convert incoming states into its own state. Directed edges in the DAGs are paths of a state sharing from vertices to other vertices. Any path in the graph starts at an input transformation node and ends at an output transformation node.

The disclosed embodiments can improve scalability of an alerting system. The disclosed embodiments also add the notion of reusability of computed results. That is, checks can be inputs for other checks, if the same computed result is needed for several checks they should take it from the same source. For example, if several checks share the same pieces of logic, then these checks can share transformation nodes common to all of them so that computation of the shared pieces of logic will be done only once.

The disclosed embodiments can also improve performance of an alerting system because the alerting system operates in a "reactive streaming mode." This means that each transformation node in the alerting system reacts on incoming events as they arrive and each transformation node re-computes its state only when one or more external conditions/states have changed. In other words, each transformation node in a network reacts only on significant changes coming from other transformation node(s) that it subscribes to. Checks are executed independently of each other so there is no notion of checks cycle. Every transformation node keeps its last state, states of its inputs, and re-computes own state only when one of its inputs change its state. State computation and state query processes run independently. Each transformation node does not need to be run periodically, but runs only if state changes of other nodes in the network collectively trigger enough state changes to trigger that transformation node to re-evaluate and possibly re-compute its state. If enough state changes occur in succession along a particular path of nodes this can ultimately change a check result (that represents the state of a check) and trigger an alert, but otherwise nothing happens. As such, the disclosed embodiments can stop computation propagation if a state of a current transformation node is unchanged, which means that unnecessary computation cycles can be reduced, minimized or eliminated when input event streams are unchanged, and that noise will not cause massive recalculations. Accordingly, less computational resources are needed.

In addition, because event streams are directly consumed by the alert system, no intermediate storage of events is required, and therefore the delay between a change in an events stream and a moment when alert is created can be reduced.

In one embodiment, an alerting system is provided that includes a streams transformer that includes a network of one or more transformation nodes. At a minimum, the network includes at least one transformation node, namely, an input transformation node connected directly to a state change processor, but in most implementations includes a plurality of transformation nodes. For example, in one embodiment, the transformation nodes include a plurality of input transformation nodes, a plurality of output transformation nodes, and intermediate nodes that connect particular input and output transformation nodes. Each input transformation node is coupled to one or more of the output transformation nodes by one or more intermediate transformation nodes. For example, each input transformation node receives a particular events stream, but can be coupled or mapped to many different intermediate and/or output transformation nodes, whereas each intermediate transformation node can be coupled or mapped to many different input, intermediate and/or output transformation nodes, and each output transformation node can be coupled or mapped to many different input and/or intermediate transformation nodes. Each transformation node (except the input transformation nodes) can subscribe to one or more transformation nodes, and can receive state updates from those transformation nodes that it subscribes to. For example, the intermediate transformation nodes and the output transformation nodes are both configured to maintain state information for each transformation node that they subscribe to. The state information is updated each time a state update is received from another transformation node.

Each input transformation node includes an input connector that is configured to receive an events stream from a particular events producer. The events stream includes time series of events received from the events producer, where each event represents something that has happened. Each input transformation node has a formula that describes a transformation rule of that input transformation node and information that indicates its position within the network. The transformation rule for that input transformation node can process the events and compute state information for the input transformation node in accordance with the transformation rule. The transformation rule can then provide state updates that indicate the state information for that input transformation node to all transformation nodes that subscribe to the input transformation node. For instance, as one non-limiting example, a particular input transformation node could have a formula that describes "pass every third value received from events stream A." This formula includes a transformation rule ("pass every third value") and also includes information that points to the position of the particular input transformation node in the network (e.g., node is attached to events stream A).

Each time a state update is received from one the transformation nodes that a particular intermediate transformation node subscribes to, that particular intermediate transformation node can evaluate state information for each of the transformation nodes that it subscribes to determine whether its state information should be updated. When stored state information for each of the transformation nodes that the particular intermediate transformation node subscribes to collectively indicates that a state update should be generated, that particular intermediate transformation node will determine that its state information should be updated, and can generate a state update that is then provided to all transformation nodes that subscribe to that particular intermediate transformation node.

For example, each intermediate transformation node can include a state module for each transformation node that it subscribes to. Each time a state update is received, each state module can store and update state information for each transformation node that it is connected to. In one embodiment, each state module can include a memory element and a state updater. The memory element stores current state information for a particular transformation node that the particular intermediate transformation node subscribes to. When the state updater receives a state update from a transformation node, it can compare the new state information (that is indicated in the state update) with the current state information stored at the memory element, and can update the current state information stored at the memory element with the new state information (that is indicated in the state update).

Each intermediate transformation node can include a re-computation trigger function and a transformation rule. Based on the current state information stored by each of the state modules, the re-computation trigger function can determine whether state information of the intermediate transformation node is to be updated (e.g., when state information stored by any of the state modules changes), and, if so, can call the transformation rule to re-compute the state information of the intermediate transformation node in accordance with the transformation rule. The transformation rule can then communicate the re-computed state information to all transformation nodes that subscribe to the intermediate transformation node. The transformation rule is a rule that describes how state information for each transformation node (that the intermediate transformation node subscribes to) is to be transformed into state information for that intermediate transformation node. Each transformation rule can be defined based on one or more operations that can be logical operations; mathematical operations; analytic operations; filter-based operations; buffered operations; or any combination thereof.

The altering system can be used to implement a number of different checks. Each check is defined by a path that includes at least an input transformation node and a state change processor. Each check can also include any number of intermediate nodes and an output transformation node. Each check that is performed produces a check result. When stored state information for each of the transformation nodes that the output transformation node subscribes to collectively indicates that the check result should be generated, then that output transformation node can generate a check result. Similar to the intermediate transformation nodes, each output transformation node can receive state updates from any of the transformation nodes that it is subscribed to, and store each of the state updates as state information.

Similar to the intermediate transformation nodes, each output transformation node can include a state module for each transformation node that the output transformation node subscribes to, a re-computation trigger function, and a transformation rule. Each state module can store state information for each transformation node that the output transformation node is connected and can update the state information each time a state update is received. The re-computation trigger function can determine, when state information stored by any of the state modules changes, whether state information of the output transformation node is to be updated based on the current state information stored by each of the state modules. The re-computation trigger function can call the transformation rule to re-compute the state information of the output transformation node in accordance with the transformation rule, and output a check result that corresponds to the re-computed state information.

Each output transformation node is coupled to a state change processor. Each transformation rule can communicate the check results to its corresponding state change processor. Each state change processor can determine whether the check results should trigger an action, and if so, can then perform that action. For example, when a check result is received from an output transformation node, each state change processor can determine (each time a check result is received) whether that check result should trigger an action, and then perform the action if it is determined that the check result should trigger the action.

In one embodiment, each state change processor includes a state module, an action trigger function, and an action function. The state module receives check results from the output transformation node, and stores and updates check results from the output transformation node each time a check result is received. The action trigger function can determine whether an updated check result provided from the state module should trigger an action, and if so, communicates a trigger command to the action function. The trigger command causes the action function to perform the action. The action performed by the action function can vary depending on the implementation. For example, the action can be (1) generation and communication of an alert signal or message; (2) generation and communication of command to trigger an action, or (3) an action triggered from a signal, message or command. For instance, the action performed by the action function can be an action such as a call to an external service via an application programming interface (API) provided by the external service to take some action.

I. Alerting System Having Stateful Transformation Nodes

FIG. 1 is a block diagram illustrating a computing environment 100 according to an embodiment.

The system comprises one or more events producer(s) 110, events storage 120, an alerting system 130, a configuration and management module 140, and one or more consumer system(s) 150. The events producer(s) 110 can include any number of events producers. An events producer can be any type of electrical or electronic system, computer-based or software-based system, mechanical system, etc. that generates an events stream that needs to be monitored. For instance, in one implementation the events producers can include a server, server system, or cluster of servers that are being monitored. Each events stream includes time series of events. As used herein, an "event" refers to something that happened, where the something that happened can be anything. An event is immutable (or irreversible) and timestamped. An event can refer to a tuple (or list of values or elements) which represents something that happened. In one embodiment, different types of events can include numeric events and informational events. A numeric event can be a result of a measurement, and can include information about source of the event, a numeric value and a time stamp. Numeric events can occur on a regular basis (e.g., once a minute) from different sources. The alerting system reacts to a numeric event based on a combination of the source and a numeric value. An informational event is non-numeric, and can include information about source of the event and information about something that happened (e.g., textual information about something that happened). Informational events occur irregularly (e.g., are not scheduled to occur on a regular basis). The alerting system reacts to an informational event based on a combination of the source and information in the event about something that happened.

Event processing refers to methodologies of tracking and analyzing streams of information (data) about things that happen (events), and deriving a conclusion from them in real-time. Complex event processing refers to event processing that combines data from multiple sources to infer events or patterns that suggest more complicated circumstances. The goal of complex event processing is to identify meaningful events (such as opportunities or threats) and respond to them as quickly as possible.

Storage 120 is optional and can be used to store events received from a number of events streams. In one embodiment, storage 120 can be implemented, for example, as a time series database that stores the events from the different events streams as a time series of events. Time series are finite or infinite sequences of data items, where each item has an associated timestamp and the sequence of timestamps is non-decreasing. Elements of a time series are often called ticks. The timestamps are not required to be ascending (merely non-decreasing) because time resolution of some systems such as financial data sources can be quite low (milliseconds, microseconds or even nanoseconds), so consecutive events may carry equal timestamps.

The alerting system 130 monitors the incoming events streams and generates actions or alerts that are received by one or more consumer system(s) 150. The configuration and management module 140 is used to configure and manage the alerting system 130. Some of the functions of the configuration and management module 140 will be described in greater detail below with reference to FIG. 6-12. The consumer system(s) 150 can include any number of consumer systems that consume actions or alerts generated by the alerting system 130. The consumer system(s) 150 can be any type of electrical or electronic system, computer-based or software-based system, mechanical system, etc. that is either called directly or via an API and reacts in response to actions or alerts generated by the alerting system 130. In some implementations, the consumer system(s) 150 and events producer(s) 110 can overlap and some instances can be the same entity. For instance, an events producer could be a server or server system, and a consumer system could be that server or another server that is part of the server system.

Figure 2:
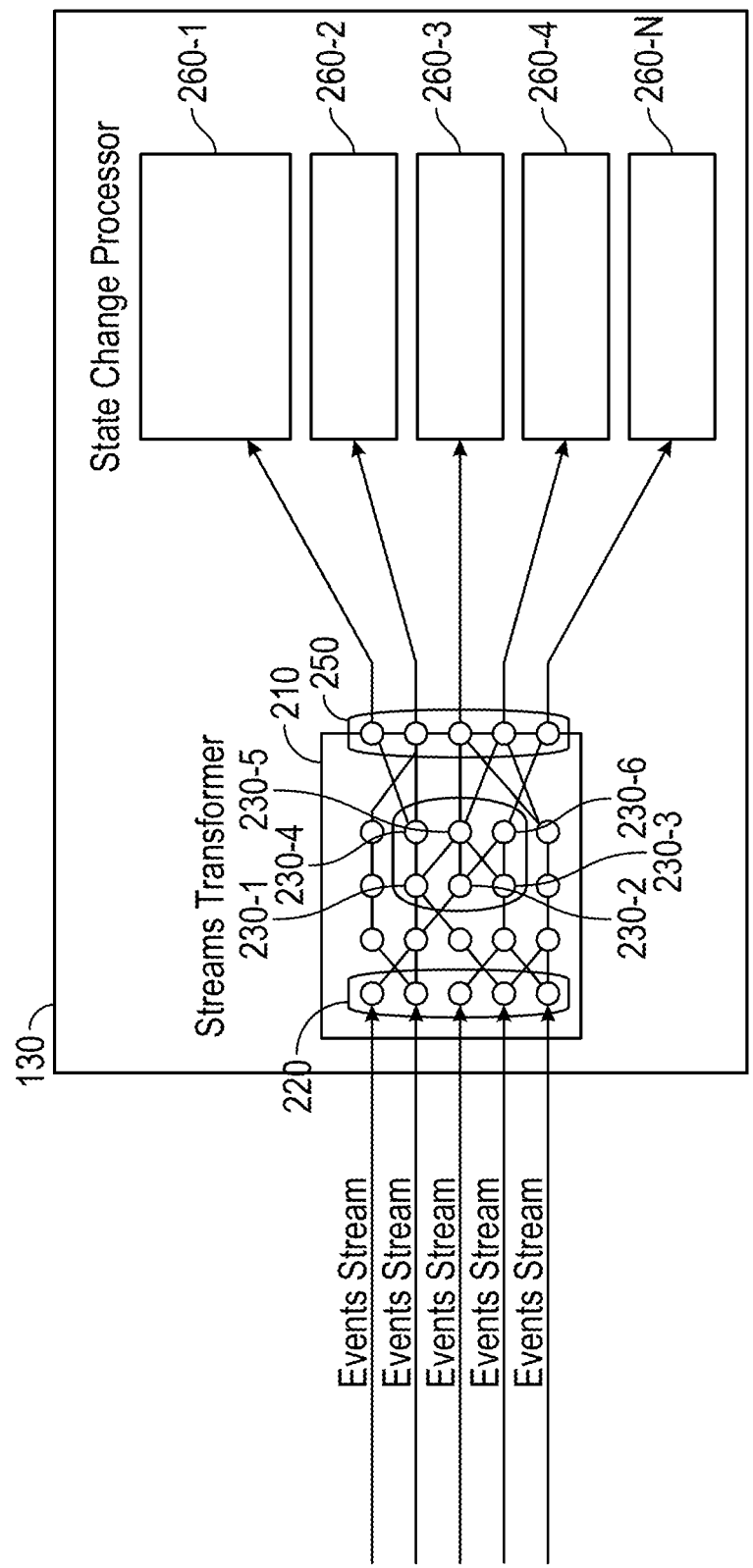
FIG. 2 is a block diagram illustrating an alerting system according to an embodiment.

FIG. 2 is a block diagram illustrating an alerting system 130 according to an embodiment. The alerting system 130 includes a streams transformer 210 and a plurality of state change processors 260 coupled to the streams transformer 210. The streams transformer 210 includes a network of transformation nodes 220, 230, 250 and connections between those transformation nodes. In FIG. 2, the transformation nodes are represented as circles. The network of transformation nodes can include input transformation nodes 220, output transformation nodes 250, and any number of intermediate transformation nodes 230 connected between the input transformation nodes 220 and output transformation nodes 250.

Figure 3:
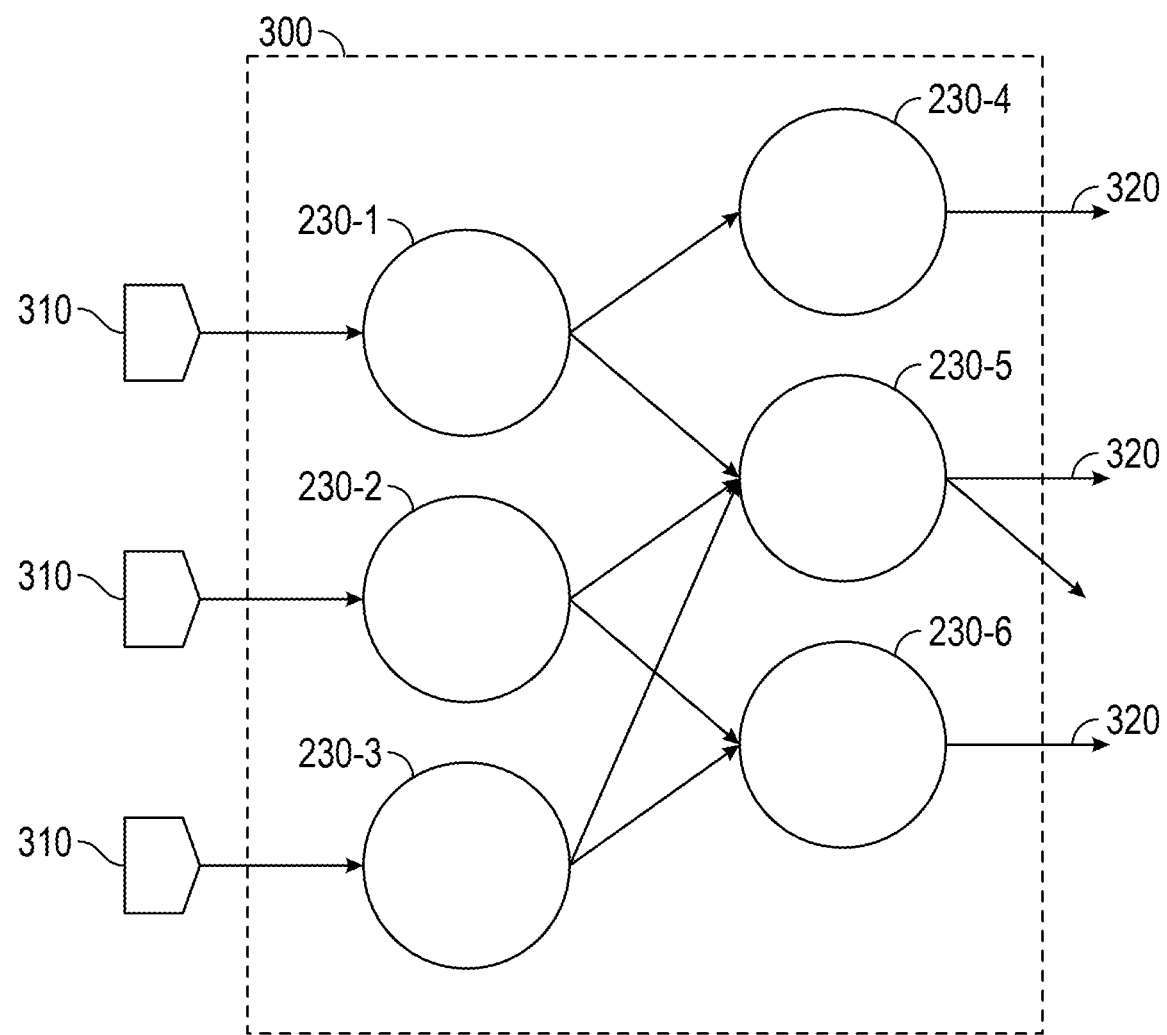
FIG. 3 is a block diagram illustrating a portion of a streams transformer of FIG. 2 according to an embodiment.

FIG. 3 is a block diagram illustrating a portion 300 of the streams transformer 210 in FIG. 2 that illustrates some particular intermediate nodes 230-1 . . . 230-6 and the concept of input connectors 310 and output connectors 320. As illustrated in FIG. 3, each transformation node of the streams transformer 210 can include one or more input connectors 310 and one or more output connectors 320.

Figure 4:
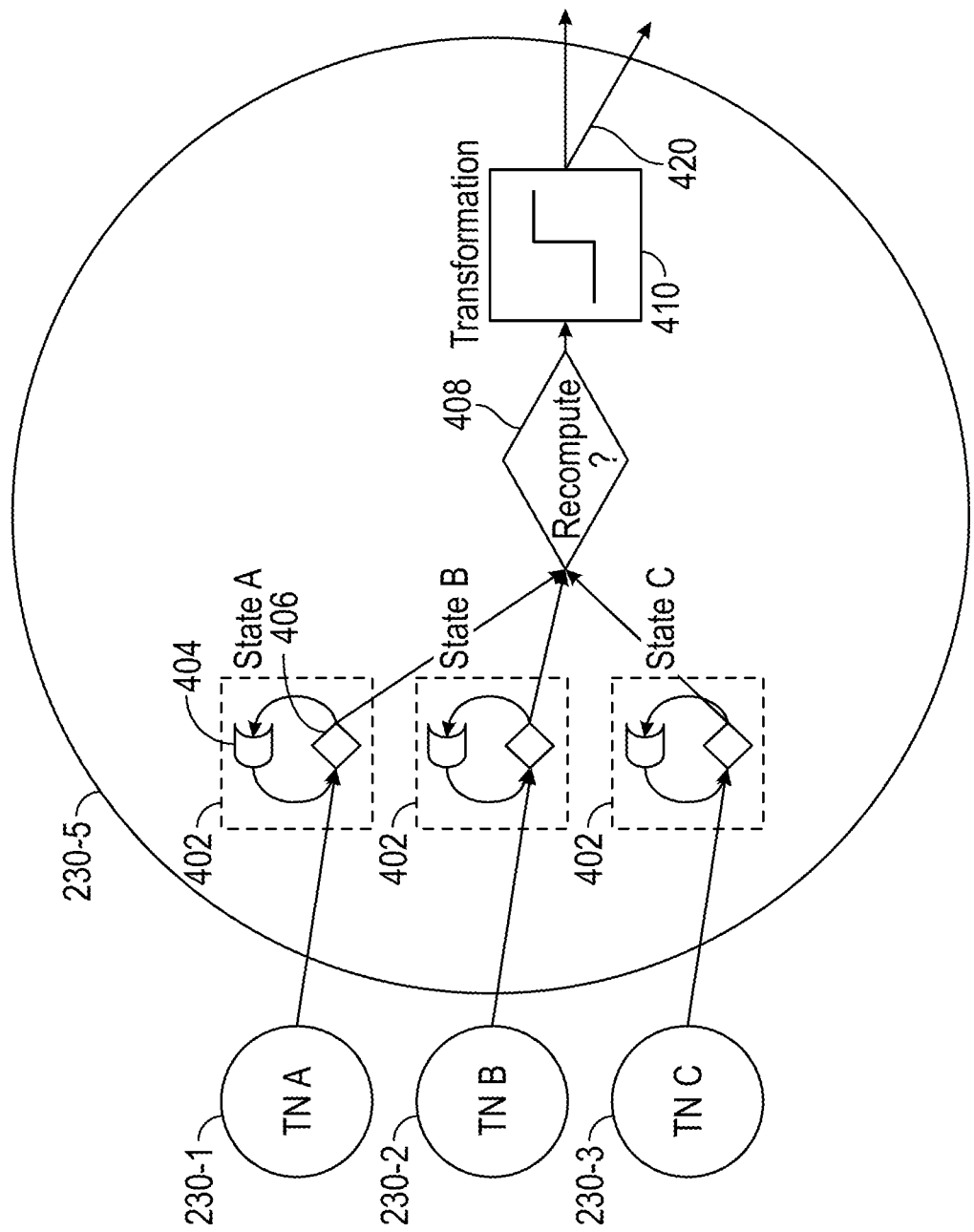
FIG. 4 is a block diagram illustrating components or modules of a particular transformation node of FIG. 2 according to an embodiment.

FIG. 4 is a block diagram illustrating components or modules of a particular transformation node 230-5 of FIG. 2 according to an embodiment. FIG. 4 also illustrates other intermediate transformation nodes 230-1 . . . 230-3 from FIG. 2 that the particular transformation node 230-5 subscribes to. Although not illustrated in FIG. 4, each of the transformation nodes illustrated in FIG. 2 can have the same basic components or modules as transformation node 230-5. The only difference is that input transformation nodes (not illustrated in FIG. 4) have a single input connector that receives an events stream and can have one or more output connectors, whereas intermediate transformation nodes can have one or more input connectors and one or more output connectors, and output transformation nodes (not illustrated in FIG. 4) can have one or more input connectors and a single output connector that outputs check results to a corresponding state change processor 260 (not illustrated in FIG. 4). As such, in the description that follows, only the components or modules of the particular intermediate transformation node 230-5 will be described, but it should be appreciated that the basic components or modules of each of the transformation node will be the same.

Each of the intermediate transformation nodes and output transformation nodes are configured to receive, via one or more input connectors, state updates from other transformation nodes that it is subscribed to. Each of the input transformation nodes can maintain state information for the events stream that it is coupled to, and each of the intermediate transformation nodes and output transformation nodes can maintain state information for each transformation node that it subscribes to (and receives state information from).

For instance, the transformation node 230-5 receives state updates from transformation nodes 230-1 . . . 230-3 that it subscribes to, and maintains state information for each transformation node 230-1 . . . 230-3 that it subscribes to (and receives state information from). To do so, the transformation node 230-5 includes a state module 402 for each transformation node 230-1 . . . 230-3 that it subscribes to. Each state module 402 stores a state for each transformation node it is connected to. In one embodiment, each state module 402 includes a memory element 404 that stores the current state of a transformation node and a state updater 406 (e.g., comparator) that updates the memory element 404 each time a state update is received from a transformation node 230-1 . . . 230-3 that it subscribes to. Thus, each state module 402 can function to keep the last known state value of each transformation node (using 404) it is coupled to, and compares any new state with the last known/recorded value using the state updater 406 whenever a new state value comes in. If they are different, the state module 402 raises a flag to notify the re-computation trigger function 408 that state may change. The re-computation trigger function 408 monitors inputs from state modules 402 and when the state modules 402 raise a flag about a change in the incoming state, then the transformation rule 410 may be called to re-compute a new state value for the state of that transformation node 230-5, and propagate that state to all nodes that are subscribed to it. The transformation rule 410 is described in greater detail below.

Each of the intermediate transformation nodes and output transformation nodes includes logic referred to as a re-computation trigger function and a transformation rule. For a particular transformation node, the trigger function determines, based on state information for each transformation node that it subscribes to, whether that particular transformation node should re-compute or update its state. When the trigger function determines that particular transformation node should not re-compute or update its state, the particular transformation node does nothing and simply maintains its current state. By contrast, when the trigger function determines that particular transformation node should re-compute or update its state, the transformation rule re-computes the state for that particular transformation node in accordance with its defined transformation rule. The particular transformation node then provides its changed/updated state (via its output connectors) to other transformation nodes that subscribe to that particular transformation node. As such, whenever the state of that particular transformation node changes, the updated state is provided to all of the other transformation nodes that subscribe to that particular transformation node.

For instance, the transformation node 230-5 includes a re-computation trigger function 408 and a transformation rule 410 that is associated with that particular transformation node 230-5. Whenever a state update is received by the transformation node 230-5 from one of the transformation nodes 230-1 . . . 230-3 that it subscribes to, it updates the state at the appropriate state module 402, and sends the current state of each state module 402 to the re-computation trigger function 408. The trigger function 408 of the transformation node 230-5 evaluates the state for each transformation node 230-1 . . . 230-3 to determine, based on state information for each transformation node 230-1 . . . 230-3 that it subscribes to, whether it should call the transformation rule 410 to re-compute or update its state. When the trigger function 408 determines that it should not re-compute or update state, the particular transformation node 230-5 does nothing and simply maintains its current state.

By contrast, when the trigger function 408 determines that state of the transformation node should be re-computed or updated, it calls the transformation rule 410 to re-compute the state for that particular transformation node 230-5 in accordance with its defined transformation rule. The particular transformation node 230-5 then provides its changed/updated state (via its output connectors 420) to other transformation nodes (not illustrated in FIG. 4) that subscribe to that particular transformation node 230-5. As such, whenever the state of that particular transformation node 230-5 changes, the updated state is provided to all of the other transformation nodes that subscribe to that particular transformation node 230-5.

The "defined transformation rule" is a rule that describes how inputs for a transformation node are transformed to a state of that transformation node. For each transformation node the defined transformation rule can be different and/or unique to that transformation node. Two transformation nodes are equivalent if they have the same inputs and also implement the same defined transformation rule. As will be explained below, equivalent transformation nodes can be de-duplicated by switching all their subscribers to one of the equivalent transformation nodes and removing the other equivalent transformation nodes. This process helps to reduce computation needs because state of the transformation nodes is computed only once.

In one embodiment, the defined transformation rule for each transformation node can be defined based on one or more operations. The operations used to define a transformation rule can be, for example, logical operations (e.g., AND, OR, XOR, etc.); arithmetic (e.g., sum, average, etc.) or other mathematical operations (e.g., integration, differentiation); analytic operations (e.g., min, max, Nth percentile, etc.); filter-based operations (e.g., >10, between 1 and 3, etc.); buffered operations (e.g., moving average, etc.); or any combination of these operations (e.g., ">10 during the last 5 minutes" would be one example of a combination of filter-based and buffered operations). For one type of transformation node, referred to as a frequency reduction transformation node, the defined transformation rule is a combined function that can be used to align frequencies of different event streams. For example, if a stream is too "noisy," the frequency reduction transformation node can produce events with a frequency much higher than an expected frequency of the rest of the system, and another frequency reduction transformation node attached to the event stream can help to downsample it and reduce the noise. For instance, in one implementation, downsampling can be implemented as a combination of a buffer operation and an analytic operation (e.g., the 95th percentile over last minute).

While most transformation nodes are subscribed to state updates from other transformation nodes and compute their state based on a state of one or more other transformation nodes that the particular transformation node subscribes to, and also have subscribers for its state changes, the input transformation nodes 220 operate differently. Referring again to FIG. 2, each input transformation node 220 differs slightly in that it has a single input connector that is used to receive an events stream from a particular events producer that the particular input transformation node 220 subscribes to. Each events stream includes time series of events received from an events producer that the particular input transformation node 220 is subscribed to. Each input transformation node 220 processes the events, computes its state in accordance with its defined transformation rule, and provides its state updates to its subscriber transformation nodes.

Each output transformation node 250 has at least one input connector to at least one other transformation node that it subscribes to. Each output transformation node 250 receives state updates from any other transformation nodes that it is connected to. For a particular output transformation node 250, the trigger function determines, based on state information for each transformation node that the particular output transformation node 250 subscribes to, whether that particular output transformation node 250 should re-compute or update its state. When the trigger function determines that particular output transformation node 250 should not re-compute or update its state, the particular output transformation node 250 does nothing and simply maintains its current state. By contrast, when the trigger function determines that particular output transformation node 250 should re-compute or update its state, the transformation rule re-computes the state for that particular output transformation node 250 in accordance with its defined transformation rule, as described above. The particular output transformation node 250 then provides its changed/updated state (via its output connector) as a "check result" to a corresponding state change processor 260. In other words, whenever the state of that particular output transformation node 250 changes, the updated state is output as a check result to a corresponding state change processor 260 (via a single output connector). As such, each output transformation node 250 outputs check results, where each check result represents a current state of a particular check. An example of a state change processor 260 will be described below with reference to FIG. 5.

Figure 5:
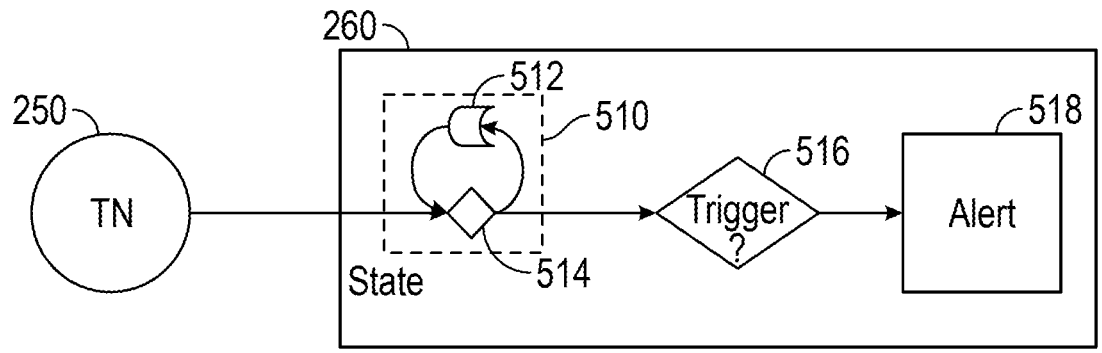
FIG. 5 is a block diagram illustrating a state change processor according to an embodiment.

FIG. 5 is a block diagram illustrating a state change processor 260 according to an embodiment. FIG. 5 will be described with reference to FIGS. 2-4. Each state change processor 260 has a single input connector that is used to receive check results from a particular output transformation node 250. Each state change processor 260 includes a state module 510, an action trigger function 516, and an action function 518 that performs an action (e.g., generates an alert) in response to a state change.

The state module 510 that includes a memory element 512 that stores the current state of the state change processor 260 and a state updater 514. The state updater 514 processes each check result received from the output transformation node 250 and updates the memory element 512 each time a new check result is received from the output transformation node 250.

The action trigger function 516 receives state changes/updates from the state module 510, and evaluates the state changes/updates to determine whether the state change/update should trigger an action.

When the action trigger function 516 determines that the state change/update should not trigger an action, it does nothing. By contrast, when the action trigger function 516 determines that the state change/update should trigger an action, the action trigger function 516 sends a trigger command to the action function 518, and in response the action function performs an action in response to the trigger command. Thus, when the output of state module 510 raises a flag about a change in the incoming check result, then the action trigger function 516 is called to generate an action by the state change processor 260. The action can be viewed as part of a formula for a state change processor, where the formula implemented by that state change processor incorporates formulas of all of the transformation nodes that it is connected to.

The action performed by the action function 518 can be (1) generation and communication of an alert signal or message, or (2) generation and communication of command to trigger an action, or (3) an action triggered from a signal, message or command.

In one embodiment, an action transforms a state of the state change processor 260 into a call to an external service. As one non-limiting example, an action can be a call to an external service via an application programming interface (API) provided by the service to take some action. For instance, in one implementation, an action can be a call to a messaging agent or web service to send an alert message. Non-limiting examples of actions can be: "send email to . . . ," or "send HTTP GET request to URL . . . ." Other non-limiting examples of actions can be a call to an API to take some action, for example, such as turning off a device or changing one of its parameters.

Figure 6:
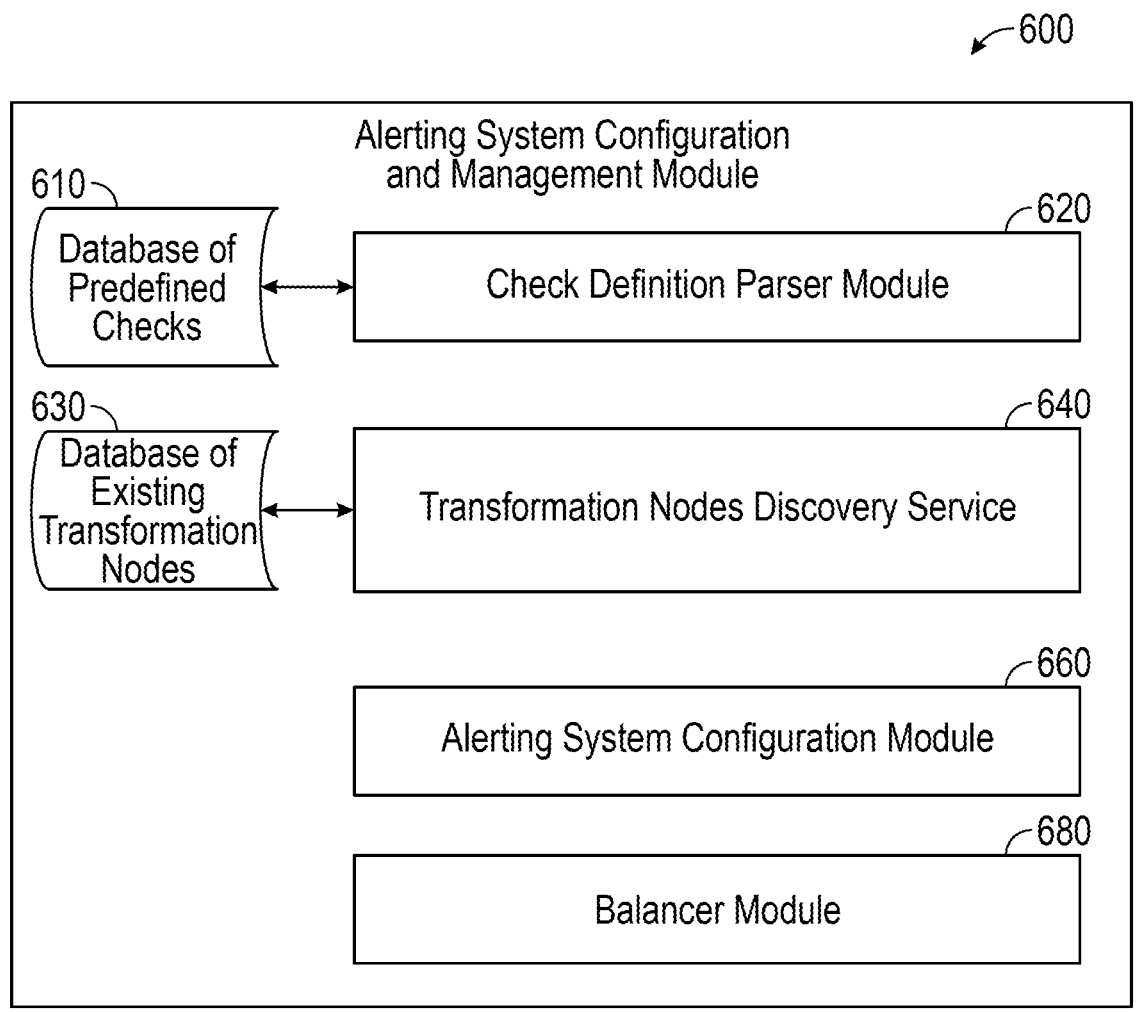
FIG. 6 is a block diagram illustrating an alerting system configuration and management module used to configure and manage an alerting system according to an embodiment.

FIG. 6 is a block diagram illustrating an alerting system configuration and management module 600 used to configure and manage an alerting system 130 according to an embodiment. The alerting system configuration and management module 600 includes a check definition parser module 620, a transformation nodes discovery service 640, an alerting system configuration module 660, and a balancer module 680.

Storage 610 stores information in a persistent computer-readable storage medium. For example, storage 610 stores a database of predefined checks. Each check can be represented and stored as a directed acyclic graph (DAG). The check definition parser module 620 transforms human readable check definitions into a set of instructions that describe what transformation nodes should be created, which events stream (e.g., data sources) should be connected to each input transformation node, and how the transformation nodes of the streams transformer 210 should be interconnected to implement the check.

Storage 630 stores information in a persistent computer-readable storage medium. For example, storage 630 stores a list of existing transformation nodes that are part of the alerting system, and other information about each existing transformation node that is part of the alerting system. For example, this other information for each transformation node can include: an identifier (e.g., a hash code) that corresponds to a formula for that transformation node, a list of other transformation nodes that the transformation node subscribes to, a list of other transformation nodes that subscribe to that transformation node, and any events stream that the transformation node is connected to, etc. To explain further, each transformation node has a formula associated with it. A formula for a particular transformation node is an expression that describes how the output(s) of other transformation node(s), that the particular transformation node subscribes to, are to be processed using a particular transformation rule for that particular transformation node. As such, the formula for a particular transformation node takes into account the formulas and transformation rules for all transformation nodes that the particular transformation node subscribes to. Each identifier can be a number or an alphanumeric sequence that can be used to uniquely identify that formula.

The transformation nodes discovery service 640 determines whether transformation nodes exist that provide a specific formula. The transformation nodes discovery service 640 can determine if any transformation nodes needed for a new check have already been created earlier (or already exist) in the alerting system) so that transformation nodes can be reused. Reuse of existing transformation nodes helps to keep the system demand for resources lower.

The alerting system configuration module 660 creates new transformation nodes and connects them according to a check setup. The alerting system configuration module 660 determines if new inputs should be created when an absolutely new event arrives. When a check is marked for removal, the alerting system configuration module 660 cleans up the alerting system, for example, by determining which transformation nodes, inputs and connections belong only to a specific check. The alerting system configuration module 660 removes any transformation nodes that are not connected to at least one state change processor either directly or indirectly.

Depending on the implementation, an alerting system 130 may be a module that is run on a single server or distributed to run on multiple servers. The implementation can depend, for example, on factors such as loading (e.g., number of event streams, transformation nodes and state change processors), or if there are requirements to run in a high availability mode in which case the alerting system 130 can be deployed to multiple servers. A group of servers running an implementation of the alerting system 130 form a cluster. Each cluster can be expanded to add new servers to the group of servers that make up that cluster. This can happen, for example, when additional computing capacity needs to be added into the system, or to increase redundancy, or to substitute a server in the cluster with a new server. Each cluster can also shrink, which means that servers can be removed from the group of servers that make up that cluster. This can happen, for example, when the current load can be handled by fewer servers making it desirable to remove unused servers to save on operational costs, or when a server that is part of the cluster is broken or requires maintenance. In either case, the server can be removed from the cluster.

The balancer module 680 re-balances checks in a cluster in a response to expansion or shrinkage of the cluster. To help ensure high availability, the balancer module 680 also keeps checks replicated to survive hardware failures to avoid service degradation. For example, in one implementation, the balancer module 680 keeps two active copies of all checks. One copy is an active copy and the other copy is a backup copy. The state change processor 260 of an active copy performs actions on state changes, while the state change processor 260 of the backup copy only reacts on state changes by updating state at storage module 512, while its action module 518 is inactive and any actions are skipped. When the active copy becomes unavailable for any reason, configuration module 660 changes the state change processor 260 of the backup check to active, and the state change processor 260 starts performing actions in reaction to state changes. The balancer module 680 provisions a new backup copy of the under-replicated check on the least loaded server, but on a server different from the server where the active copy runs. If the copy which was active before becomes available again, then the alerting system configuration module 660 either turns it to backup if a new backup copy was not created yet or removes it if the new backup copy was created already.

Figure 7:
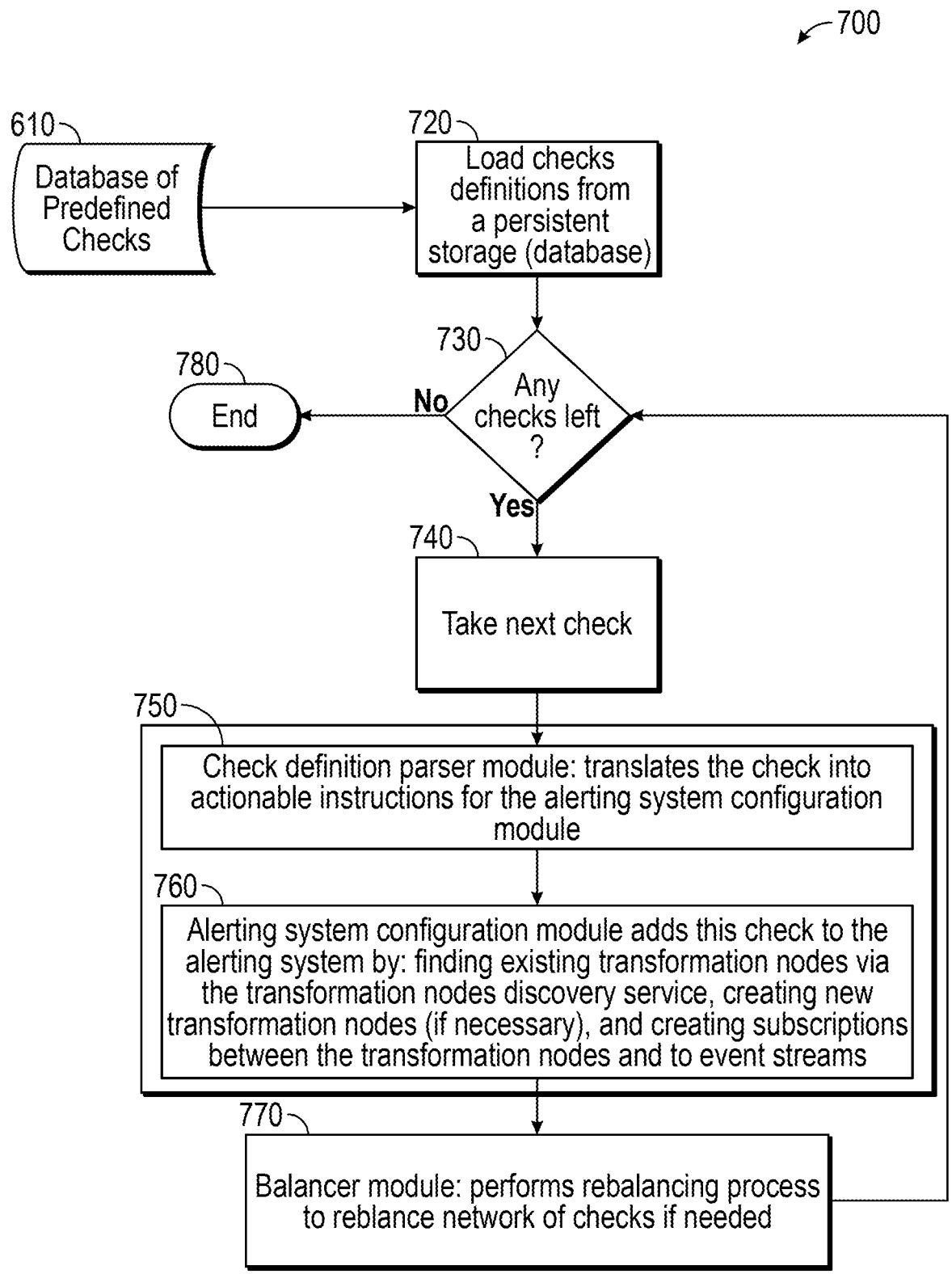
FIG. 7 is a flow diagram illustrating a system startup method performed by the alerting system configuration module including a sub-process for adding new checks to the alerting system according to an embodiment.

FIG. 7 is a flow diagram illustrating a system startup method 700 performed by the alerting system configuration module 660 including a sub-process 750, 760 for adding new checks to the alerting system 130 according to an embodiment.

The method 700 begins when the alerting system starts up at 720, and the alerting system configuration module 660 loads checks (or check definitions) from a database of predefined checks that is stored in storage 610. As noted above, each check (or check definition) can be stored as a textual formula. The formula can be converted into a directed acyclic graph (DAG) representation by the Check Definition Parser 620. The method 700 then continues by adding each new check to the altering system, as will now be described with reference to 730 through 780.

At 730, the alerting system configuration module 660 determines whether any new checks remain to be added to the alerting system. When the alerting system configuration module 660 determines (at 730) new checks remain to be added to the alerting system, the method 700 proceeds to 740.

At 740, the alerting system configuration module 660 loads the next new check to be added to the alerting system at the check definition parser module 620, which during the first iteration of the loop will be the first new check to be added.

At 750, the check definition parser module 620 converts or translates the next new check to be added to the alerting system into a set of actionable instructions that correspond to a DAG. For example, in one embodiment of 750, the check definition parser module 620 transforms the new human readable check definition into a set of actionable instructions for the alerting system configuration module 660. These instructions describe which transformation nodes should be used and/or created, which events stream (e.g., data sources) are to be connected to each input transformation node, and how the transformation nodes are interconnected to implement the check at the output transformation node and what action should be implemented by a new state change processor 260.

The method 700 then proceeds to 760, where the alerting system configuration module 660 adds the new check (e.g. DAG) to the altering system. For example, in one embodiment, the alerting system configuration module 660 calls the transformation nodes discovery service 640 to find existing transformation nodes including input transformation nodes (e.g., FIG. 9) and either creates a subscription to existing transformation nodes including input transformation nodes if the transformation nodes were found or creates new transformation nodes. The alerting system configuration module 660 then creates subscriptions between the newly created transformation nodes including the output transformation nodes, and subscriptions to event streams by the input transformation nodes. The alerting system configuration module 660 then creates a state change processor 260 and adds a subscription between the state change processor 260 and the output transformation node 250.

It should also be noted that while steps 750 and 760 can be performed on startup of the system, these steps can also be performed any time a new check is to be added to the system (e.g., after system startup). When a new check is requested by a user, it can be added to a queue so that it can be added for implementation. When a check is to be added to the alerting system, the alerting system configuration module 660 can pull a check from the queue of new checks, and if necessary can create new transformation nodes, inputs, an output, a state change processor and connections between transformation nodes to build the check. Once the check is built, it can be loaded. Once the check if fully operational and state of the check is valid, it is considered to be active. As will be explained below, when a check as no longer needed, it can be marked as decommissioned, and then removed by the alerting system configuration module 660.

Referring again to FIG. 7, the method 700 then proceeds to 770, where the alerting system configuration module 660 calls the balancer module 680 to perform a rebalancing process that will be described further below with respect to FIG. 12, and the method 700 loops back to 730, where the alerting system configuration module 660 determines whether any new checks remain to be added to the alerting system. Steps 730 through 770 continue to loop until the alerting system configuration module 660 determines (at 730) that no new checks remain to be added to the alerting system, at which point the method 700 proceeds to 780 where the method 700 ends.

Figure 8:
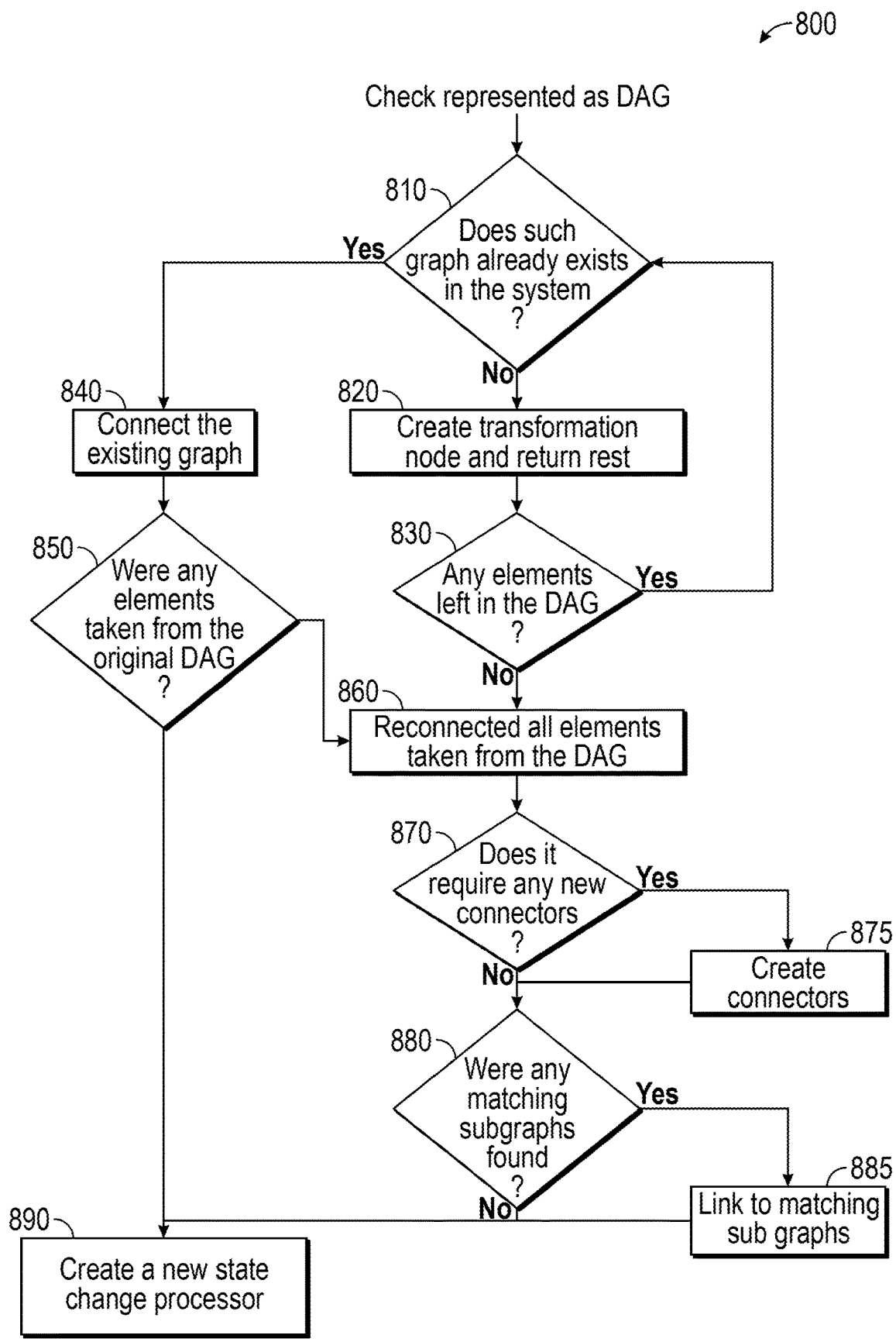
FIG. 8 is a flow diagram illustrating a method performed by an alerting system configuration module for applying a new check represented as a directed acyclic graph (DAG) to an existing alerting system according to an embodiment.

FIG. 8 is a flow diagram illustrating a method 800 performed by an alerting system configuration module 660 for applying a new check represented as a directed acyclic graph (DAG) to an existing system according to an embodiment.

The method 800 begins at 810, where the alerting system configuration module 660 receives a check that is represented as a directed acyclic graph (DAG). The alerting system configuration module 660 traverses through the DAG starting from the output transformation node and working back to input transformation nodes to determine whether subgraph of the direct acyclic graph already exists in the a database of predefined checks (at storage 610).

When the alerting system configuration module 660 determines (at 810) that any part of the received check (that is represented as a DAG) already exists in the database of predefined checks (at storage 610) as part of an existing check, the method 800 proceeds to 840. At 840, the alerting system configuration module 660 adds a connection to the existing DAG for the check (i.e., the DAG for that check that already exists in the database of predefined checks at storage 610). The method 800 then proceeds to 850, where the alerting system configuration module 660 determines whether any elements were taken from the DAG of the new check. When the alerting system configuration module 660 determines (at 850) that no elements were taken from the original check, the method 800 proceeds to 890, where the alerting system configuration module 660 creates a new state change processor 260 with an output transformation node for the new check and adds a subscription to a transformation node with the same formula as the new check. When the alerting system configuration module 660 determines (at 850) that one or more elements were taken from the new check, the method 800 proceeds to 860, where the alerting system configuration module 660 re-connects all elements taken from the existing check.

When the alerting system configuration module 660 determines (at 810) that the received check (that is represented as a DAG) or part of it left from previous steps does not already exist in the database of predefined checks as an existing check (at storage 610), the method 800 proceeds to 820. At 820, the alerting system configuration module 660 takes one element from the existing check (that is represented as a DAG) or from a part of it left from the previous steps, creates a new transformation node, connects the new transformation node to nodes created on the previous iterations according to definition of the new check (that is represented as a DAG) and returns all elements of the DAG left after extraction of the one element so that one can be processed on the next iteration. The method 800 then proceeds to 830, where the alerting system configuration module 660 determines whether any intermediate transformation nodes are left in the DAG that represents the received check. When the alerting system configuration module 660 determines (at 830) that any elements are left in the DAG (that represents the received check), the method 800 loops back to 810.

When the alerting system configuration module 660 determines (at 830) that no elements are left in the DAG (that represents the received check), the method 800 proceeds to 860, where the alerting system configuration module 660 re-connects all elements taken from the DAG (that represents the received check). The method 800 then proceeds to 870, where the alerting system configuration module 660 determines whether any new input connectors are required to add the check to the alerting system.

When the alerting system configuration module 660 determines (at 870) that no new input connectors are required, the method 800 proceeds directly to 880. By contrast, when the alerting system configuration module 660 determines (at 870) that one or more new input connectors are required, the method 800 proceeds to 875, where the alerting system configuration module 660 creates the new input connectors that are required, and the method 800 proceeds to 880.

At 880, the alerting system configuration module 660 determines whether any matching subgraphs of the DAG (that represents the received check) were found in the system on one or more of executions of the 810. When the alerting system configuration module 660 determines (at 880) that no matching subgraphs were found in the DAG (that represents the received check), the method 800 proceeds directly to 890, where the alerting system configuration module 660 creates the new output transformation node and the new change state processor. By contrast, when the alerting system configuration module 660 determines (at 880) that any matching subgraphs of the DAG (that represents the received check) were found at one or more executions of the 810, the method 800 proceeds to 885, where the alerting system configuration module 660 creates subscriptions between those subgraphs and newly created transformation nodes according to the DAG (the represents the received check), and the method 800 then proceeds to 890, where the alerting system configuration module 660 creates a new output transformation node and the new change state processor.

Figure 9:
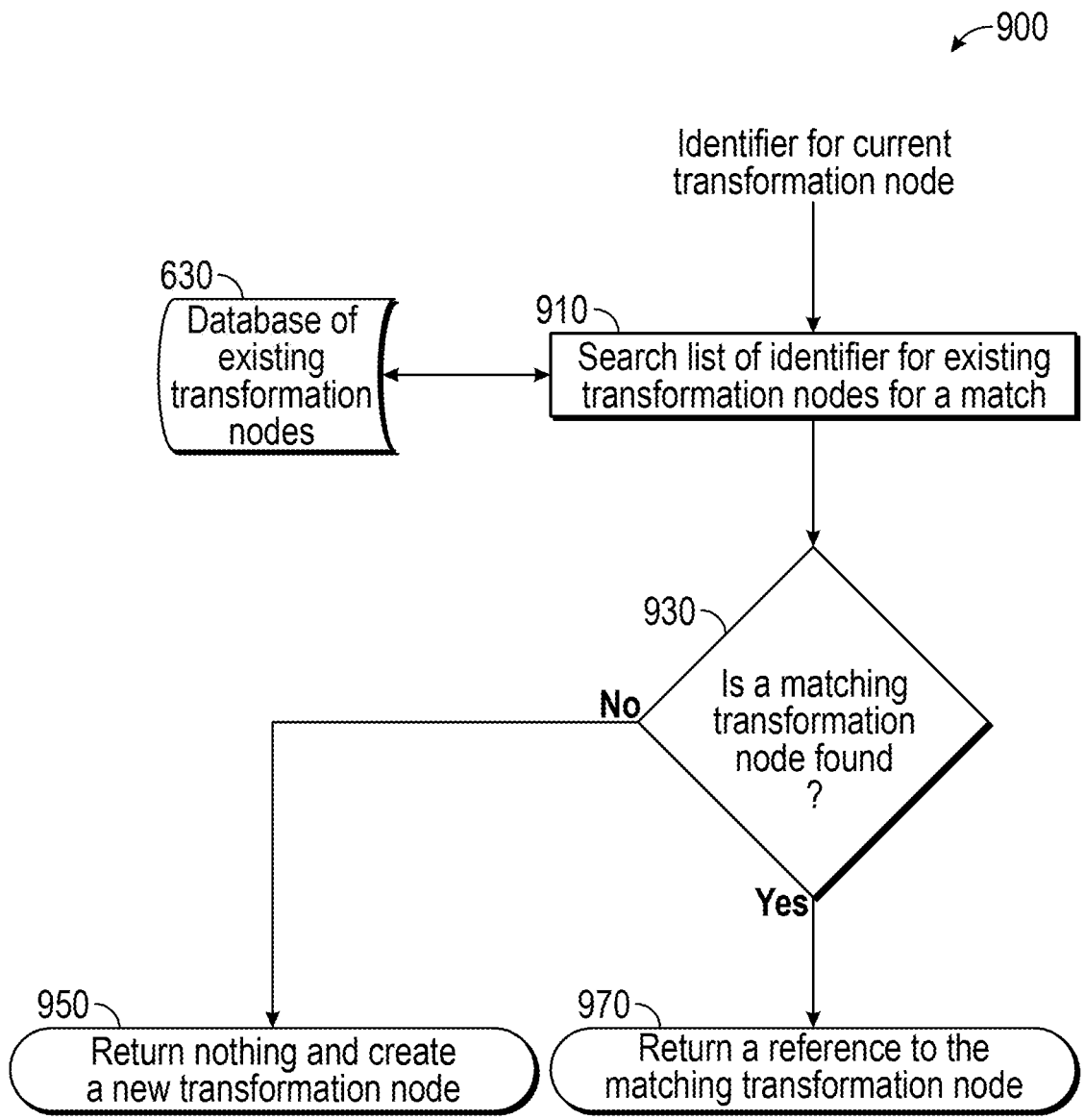
FIG. 9 is a flow diagram illustrating a method performed by a transformation nodes discovery service module for discovering existing transformation nodes or creating new transformation nodes according to an embodiment.

FIG. 9 is a flow diagram illustrating a method 900 performed by a transformation nodes discovery service module 640 for discovering existing transformation nodes or creating new transformation nodes according to an embodiment. The method 900 begins at 910, where the transformation nodes discovery service 640 receives an identifier for a current transformation node (e.g., a hash code that corresponds to a formula that defines a current transformation node), and searches a list of identifiers for existing transformation nodes stored in storage 630 for a matching identifier. The method 900 then proceeds to 930, where the transformation nodes discovery service 640 determines whether a matching identifier was found in the list of identifiers for existing transformation nodes (e.g., an identifier that matches the identifier that corresponds to a formula that defines the current transformation node).

When the transformation nodes discovery service 640 determines that a matching identifier was not found in the list of identifiers for existing transformation nodes, the method 900 proceeds to 940, where the transformation nodes discovery service 640 returns an indication that no matching transformation node was found in the list of existing transformation nodes. In response to this indication, the alerting system configuration module 660 can create a new transformation node and adds it to the alerting system 130.

When the transformation nodes discovery service 640 determines that a matching identifier was found in the list of identifiers for existing transformation nodes, the method 900 proceeds to 950, where the transformation nodes discovery service 640 returns an indication that a matching transformation node was found in the list of existing transformation nodes.

Figure 10:
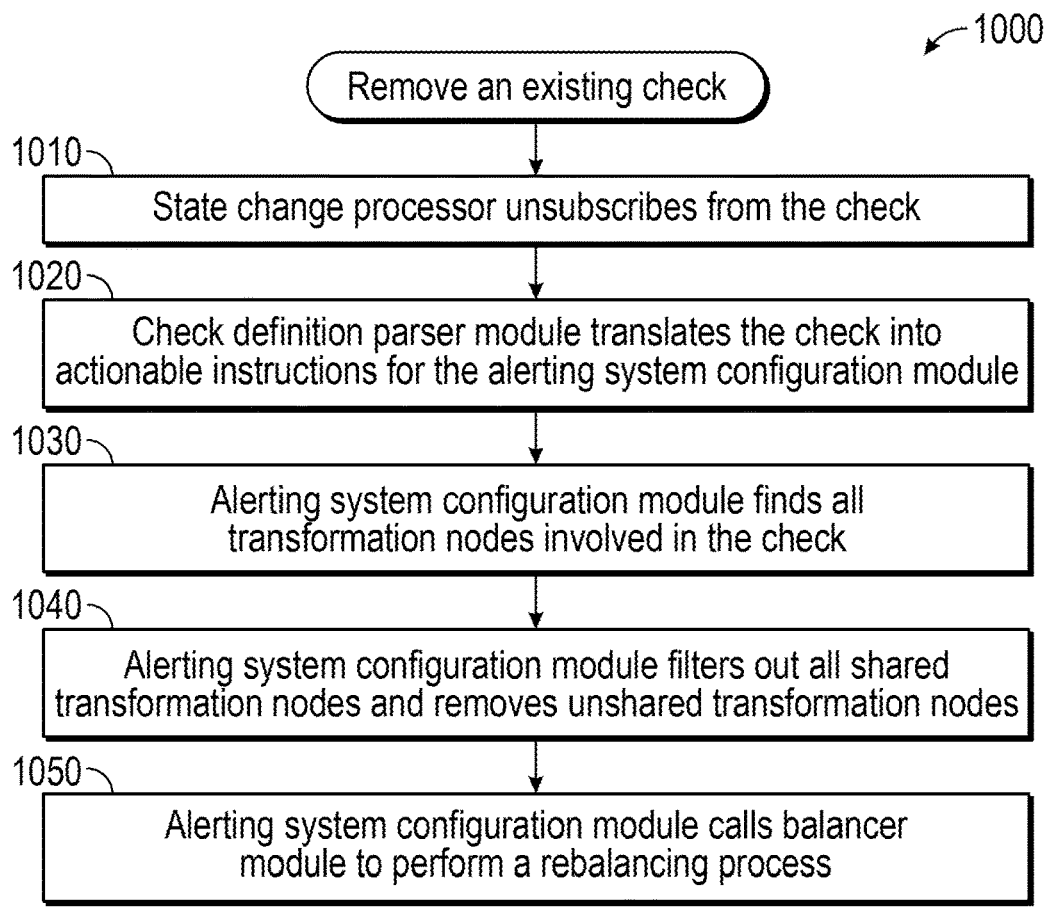
FIG. 10 is a flow diagram illustrating a method for removing an existing check from the alerting system according to an embodiment.

FIG. 10 is a flow diagram illustrating a method 1000 for removing an existing check from the alerting system 130 according to an embodiment.

When an existing check is to be removed, the state change processor 260 unsubscribe from the check at 1010. At 1020, the check definition parser module 620 translates the check into actionable instructions for the alerting system configuration module 660, and at 1030, the alerting system configuration module 660 uses the instructions to find all transformation nodes involved into the check. For example, the alerting system configuration module 660 use a backward inspection along a path from the output transformation node for that check to the input transformation node for that check. At 1040, the alerting system configuration module 660 filters out all transformation nodes in the path that are shared and the removes any unshared transformation nodes along the path. At 1050, the alerting system configuration module 660 calls the balancer module to perform a rebalancing process.

Figure 11:
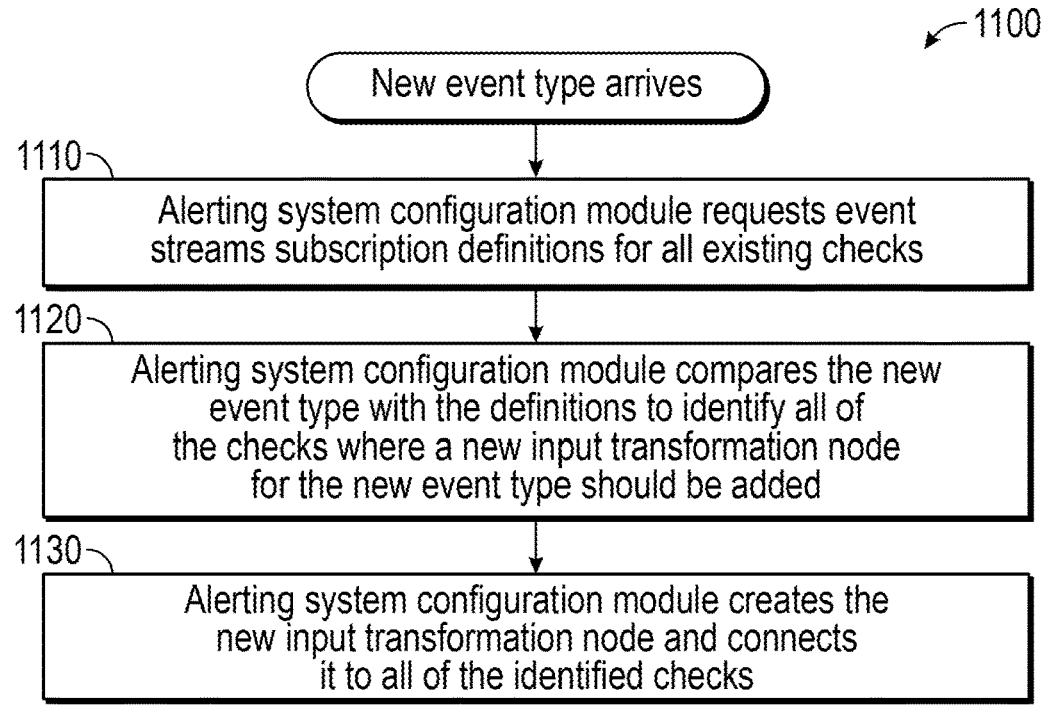
FIG. 11 is a flow diagram illustrating a method performed by an alerting system configuration module when a new event type arrives according to an embodiment.

FIG. 11 is a flow diagram illustrating a method 1100 performed by an alerting system configuration module 660 when a new event type arrives according to an embodiment. When an event of a new type arrives (new metric or new kind of other events, but not a new data point) it forms a new events stream. At 1110, the alerting system configuration module requests all current subscription definitions for all existing checks. At 1120, the alerting system configuration module 660 compares the new event type with the definitions to identify all of the checks where a new input connector and input transformation node for the new event type are added. At 1130, the alerting system configuration module 660 creates the new input transformation node, and connects it to all of the identified checks.

Figure 12:
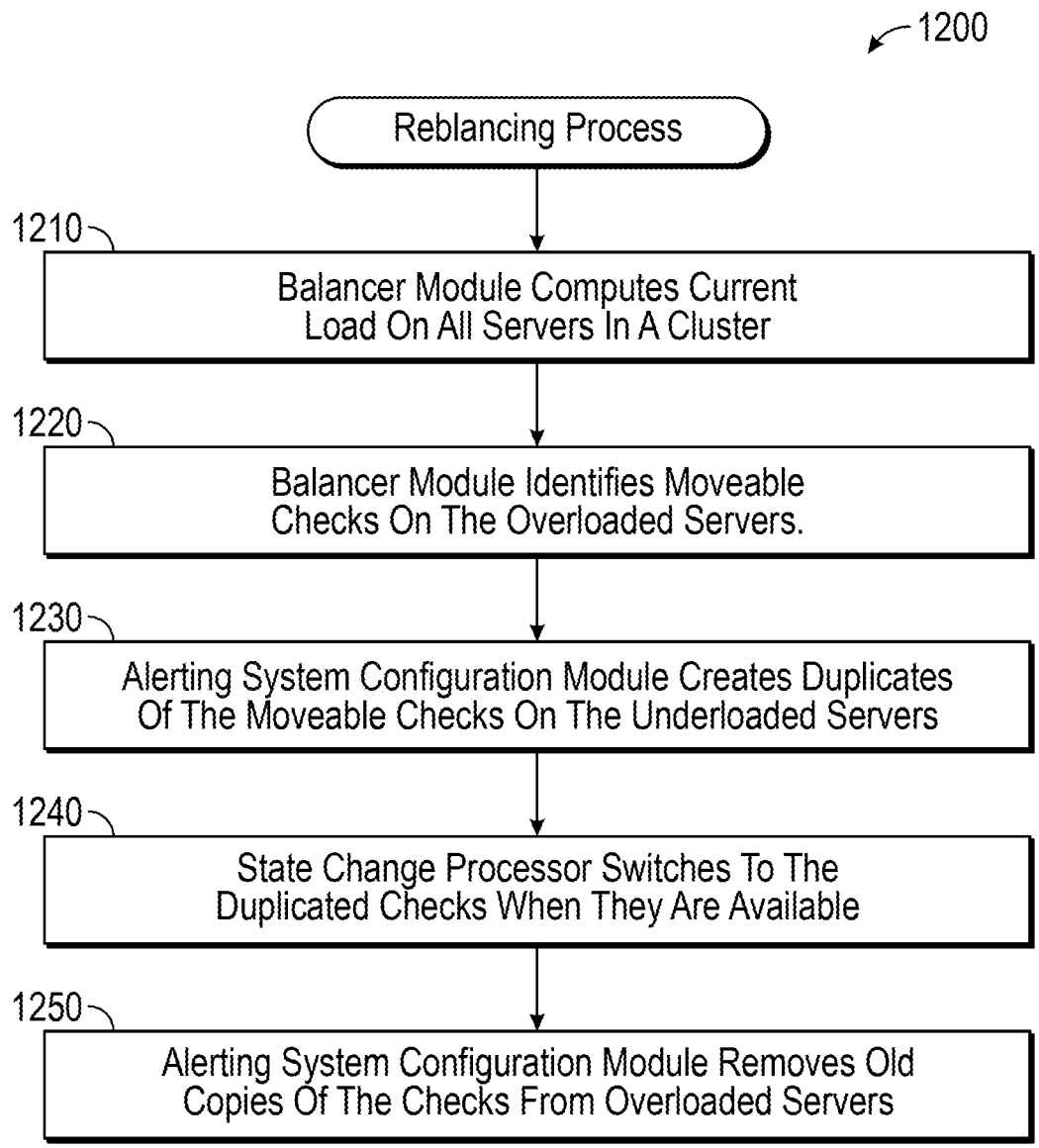
FIG. 12 is a flow diagram illustrating a rebalancing method performed by a balancer module according to an embodiment.

FIG. 12 is a flow diagram illustrating a rebalancing method 1200 performed by a balancer module 680 according to an embodiment. The balancer module 680 can perform the rebalancing method 1200, for example, when a list of servers in a cluster changes (e.g., increases or decreases) to keep all servers in a cluster loaded equally. The rebalancing process 1200 begins at 1210, where the balancer module 680 computes current load on each server in a cluster. At 1220, the balancer module 680 identifies moveable checks on any server that is overloaded. If a check or group of checks run on an isolated graph of transformation nodes, then that check or group of checks can be moved from one server to another server. If a check can be moved it is referred to as "moveable" check. At 1230, the alerting system configuration module 660 creates duplicates of any moveable checks on one of the underloaded servers in the cluster (i.e., one of the servers that are not overloaded and have capacity). At 1240, the state change processor 260 makes the newly created checks active as soon as they are available. At 1250, the alerting system configuration module 660 removes old backup copies of the checks from the overloaded servers.

II. Example System Overview

The following description is of one example of a system in which the features described above may be implemented. The components of the system described below are merely one example and should not be construed as limiting. The features described above with respect to FIGS. 1-12 may be implemented in any other type of computing environment, such as one with multiple servers, one with a single server, a multi-tenant server environment, a single-tenant server environment, or some combination of the above.

Figure 13:
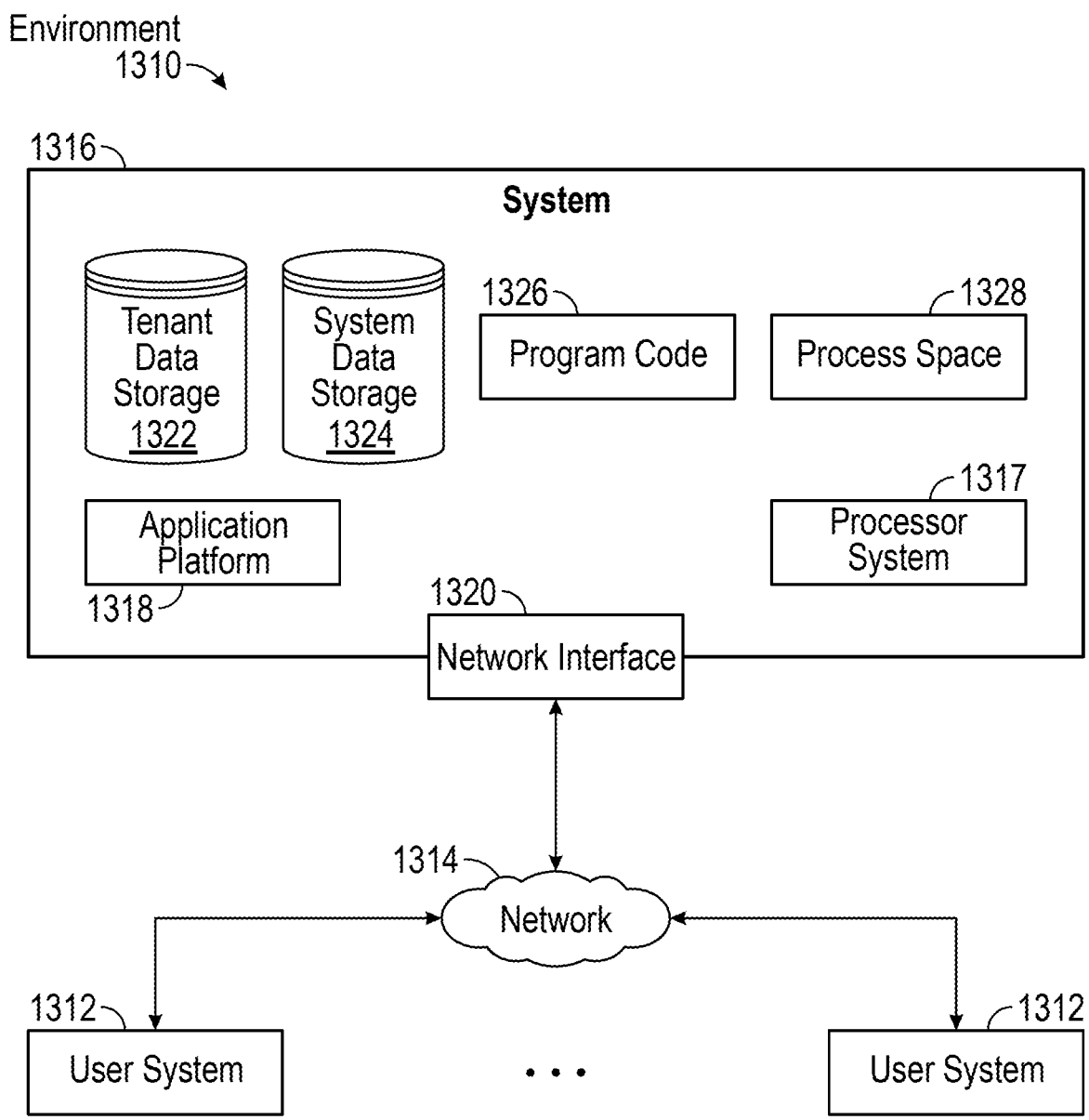
FIG. 13 shows a block diagram of an example environment in which an on-demand database service can be used in accordance with some embodiments.

FIG. 13 shows a block diagram of an example of an environment 1310 in which an on-demand database service can be used in accordance with some implementations. The environment 1310 includes user systems 1312, a network 1314, a database system 1316 (also referred to herein as a "cloud-based system"), a processor system 1317, an application platform 1318, a network interface 1320, tenant database 1322 for storing tenant data 1323, system database 1324 for storing system data 1325, program code 1326 for implementing various functions of the system 1316, and process space 1328 for executing database system processes and tenant-specific processes, such as running applications as part of an application hosting service. In some other implementations, environment 1310 may not have all of these components or systems, or may have other components or systems instead of, or in addition to, those listed above.

In some implementations, the environment 1310 is an environment in which an on-demand database service exists. An on-demand database service, such as that which can be implemented using the system 1316, is a service that is made available to users outside of the enterprise(s) that own, maintain or provide access to the system 1316. As described above, such users generally do not need to be concerned with building or maintaining the system 1316. Instead, resources provided by the system 1316 may be available for such users' use when the users need services provided by the system 1316; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 1318 can be a framework that allows the applications of system 1316 to execute, such as the hardware or software infrastructure of the system 1316. In some implementations, the application platform 1318 enables the creation, management and execution of one or more applications developed by the provider of the on-demand database service, users accessing the on-demand database service via user systems 1312, or third party application developers accessing the on-demand database service via user systems 1312.

In some implementations, the system 1316 implements a web-based customer relationship management (CRM) system. For example, in some such implementations, the system 1316 includes application servers configured to implement and execute CRM software applications as well as provide related data, code, forms, renderable web pages and documents and other information to and from user systems 1312 and to store to, and retrieve from, a database system related data, objects, and Web page content. In some MTS implementations, data for multiple tenants may be stored in the same physical database object in tenant database 1322. In some such implementations, tenant data is arranged in the storage medium(s) of tenant database 1322 so that data of one tenant is kept logically separate from that of other tenants so that one tenant does not have access to another tenant's data, unless such data is expressly shared. The system 1316 also implements applications other than, or in addition to, a CRM application. For example, the system 1316 can provide tenant access to multiple hosted (standard and custom) applications, including a CRM application. User (or third party developer) applications, which may or may not include CRM, may be supported by the application platform 1318. The application platform 1318 manages the creation and storage of the applications into one or more database objects and the execution of the applications in one or more virtual machines in the process space of the system 1316.

According to some implementations, each system 1316 is configured to provide web pages, forms, applications, data and media content to user (client) systems 1312 to support the access by user systems 1312 as tenants of system 1316. As such, system 1316 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 1314 can be or include any network or combination of networks of systems or devices that communicate with one another. For example, the network 1314 can be or include any one or any combination of a LAN (local area network), WAN (wide area network), telephone network, wireless network, cellular network, point-to-point network, star network, token ring network, hub network, or other appropriate configuration. The network 1314 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 1312 can communicate with system 1316 using TCP/IP and, at a higher network level, other common Internet protocols to communicate, such as HTTP, FTP, AFS, WAP, etc. In an example where HTTP is used, each user system 1312 can include an HTTP client commonly referred to as a "web browser" or simply a "browser" for sending and receiving HTTP signals to and from an HTTP server of the system 1316. Such an HTTP server can be implemented as the sole network interface 1320 between the system 1316 and the network 1314, but other techniques can be used in addition to or instead of these techniques. In some implementations, the network interface 1320 between the system 1316 and the network 1314 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 1312 can be implemented as any computing device(s) or other data processing apparatus or systems usable by users to access the database system 1316. For example, any of user systems 1312 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 1312 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 1316) of the user system 1312 to access, process and view information, pages and applications available to it from the system 1316 over the network 1314.

Each user system 1312 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 1312 in conjunction with pages, forms, applications and other information provided by the system 1316 or other systems or servers. For example, the user interface device can be used to access data and applications hosted by system 1316, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 1312 may differ in their respective capacities, and the capacity of a particular user system 1312 can be entirely determined by permissions (permission levels) for the current user of such user system. For example, where a salesperson is using a particular user system 1312 to interact with the system 1316, that user system can have the capacities allotted to the salesperson. However, while an administrator is using that user system 1312 to interact with the system 1316, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 1312 and some or all of its components are operator-configurable using applications, such as a browser, including computer code executed using a central processing unit (CPU) such as an Intel Pentium® processor or the like. Similarly, the system 1316 (and additional instances of an MTS, where more than one is present) and all of its components can be operator-configurable using application(s) including computer code to run using the processor system 1317, which may be implemented to include a CPU, which may include an Intel Pentium® processor or the like, or multiple CPUs.

The system 1316 includes tangible computer-readable media having non-transitory instructions stored thereon/in that are executable by or used to program a server or other computing system (or collection of such servers or computing systems) to perform some of the implementation of processes described herein. For example, computer program code 1326 can implement instructions for operating and configuring the system 1316 to intercommunicate and to process web pages, applications and other data and media content as described herein. In some implementations, the computer code 1326 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 14:
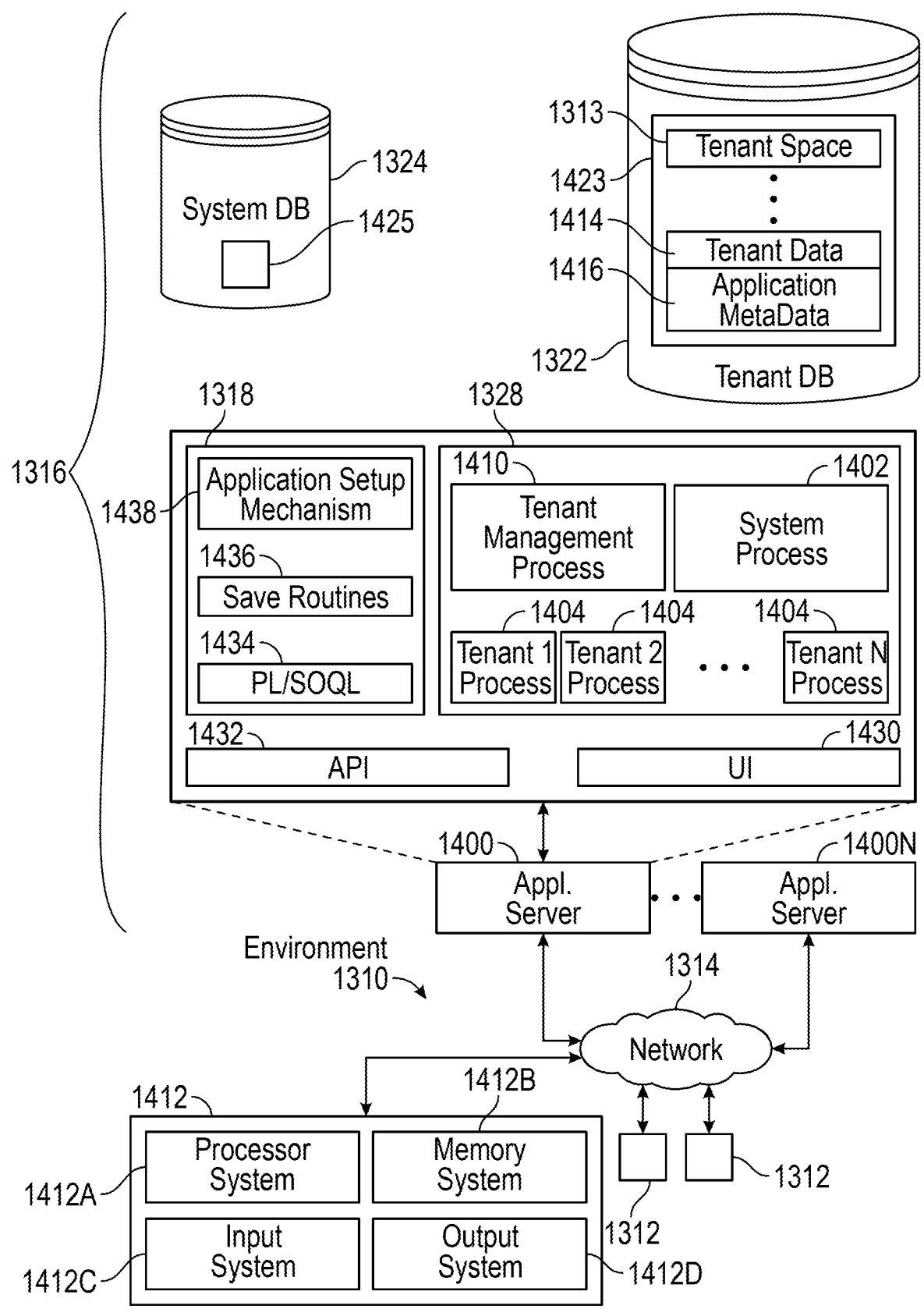
FIG. 14 shows a block diagram of example implementations of elements of FIG. 13 and example interconnections between these elements according to some embodiments.

FIG. 14 shows a block diagram of example implementations of elements of FIG. 13 and example interconnections between these elements according to some implementations. That is, FIG. 14 also illustrates environment 1310, but FIG. 14, various elements of the system 1316 and various interconnections between such elements are shown with more specificity according to some more specific implementations. Elements from FIG. 13 that are also shown in FIG. 14 will use the same reference numbers in FIG. 14 as were used in FIG. 13. Additionally, in FIG. 14, the user system 1312 includes a processor system 1412A, a memory system 1412B, an input system 1412C, and an output system 1412D. The processor system 1412A can include any suitable combination of one or more processors. The memory system 1412B can include any suitable combination of one or more memory devices. The input system 1412C can include any suitable combination of input devices, such as one or more touchscreen interfaces, keyboards, mice, trackballs, scanners, cameras, or interfaces to networks. The output system 1412D can include any suitable combination of output devices, such as one or more display devices, printers, or interfaces to networks.

In FIG. 14, the network interface 1320 of FIG. 13 is implemented as a set of HTTP application servers 1400₁-1400N. Each application server 1400, also referred to herein as an "app server," is configured to communicate with tenant database 1322 and the tenant data 1423 therein, as well as system database 1324 and the system data 1425 therein, to serve requests received from the user systems 1412. The tenant data 1423 can be divided into individual tenant storage spaces 1413, which can be physically or logically arranged or divided. Within each tenant storage space 1413, tenant data 1414 and application metadata 1416 can similarly be allocated for each user. For example, a copy of a user's most recently used (MRU) items can be stored to user storage 1414. Similarly, a copy of MRU items for an entire organization that is a tenant can be stored to tenant storage space 1413.

The process space 1328 includes system process space 1402, individual tenant process spaces 1404 and a tenant management process space 1410. The application platform 1318 includes an application setup mechanism 1438 that supports application developers' creation and management of applications. Such applications and others can be saved as metadata into tenant database 1322 by save routines 1436 for execution by subscribers as one or more tenant process spaces 1404 managed by tenant management process 1410, for example. Invocations to such applications can be coded using PL/SOQL 1434, which provides a programming language style interface extension to API 1432. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 1316 of FIG. 14 also includes a user interface (UI) 1430 and an application programming interface (API) 1432 to system 1316 resident processes to users or developers at user systems 1412. In some other implementations, the environment 1310 may not have the same elements as those listed above or may have other elements instead of, or in addition to, those listed above.

Each application server 1400 can be communicably coupled with tenant database 1322 and system database 1324, for example, having access to tenant data 1423 and system data 1425, respectively, via a different network connection. For example, one application server 1400₁ can be coupled via the network 1314 (for example, the Internet), another application server 1400N can be coupled via a direct network link, and another application server (not illustrated) can be coupled by yet a different network connection. Transfer Control Protocol and Internet Protocol (TCP/IP) are examples of typical protocols that can be used for communicating between application servers 1400 and the system 1316. However, it will be apparent to one skilled in the art that other transport protocols can be used to optimize the system 1316 depending on the network interconnections used.

In some implementations, each application server 1400 is configured to handle requests for any user associated with any organization that is a tenant of the system 1316. Because it can be desirable to be able to add and remove application servers 1400 from the server pool at any time and for various reasons, in some implementations there is no server affinity for a user or organization to a specific application server 1400. In some such implementations, an interface system implementing a load balancing function (for example, an F5 Big-IP load balancer) is communicably coupled between the application servers 1400 and the user systems 1412 to distribute requests to the application servers 1400. In one implementation, the load balancer uses a least-connections algorithm to route user requests to the application servers 1400. Other examples of load balancing algorithms, such as round robin and observed-response-time, also can be used. For example, in some instances, three consecutive requests from the same user could hit three different application servers 1400, and three requests from different users could hit the same application server 1400. In this manner, by way of example, system 1316 can be a multi-tenant system in which system 1316 handles storage of, and access to, different objects, data and applications across disparate users and organizations.

In one example storage use case, one tenant can be a company that employs a sales force where each salesperson uses system 1316 to manage aspects of their sales. A user can maintain contact data, leads data, customer follow-up data, performance data, goals and progress data, etc., all applicable to that user's personal sales process (for example, in tenant database 1322). In an example of a MTS arrangement, because all of the data and the applications to access, view, modify, report, transmit, calculate, etc., can be maintained and accessed by a user system 1412 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 1316 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 1316 also can maintain system level data usable by multiple tenants or other data. Such system level data can include industry reports, news, postings, and the like that are sharable among tenants.

In some implementations, the user systems 1412 (which also can be client systems) communicate with the application servers 1400 to request and update system-level and tenant-level data from the system 1316. Such requests and updates can involve sending one or more queries to tenant database 1322 or system database 1324. The system 1316 (for example, an application server 1400 in the system 1316) can automatically generate one or more SQL statements (for example, one or more SQL queries) designed to access the desired information. System database 1324 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 15A:
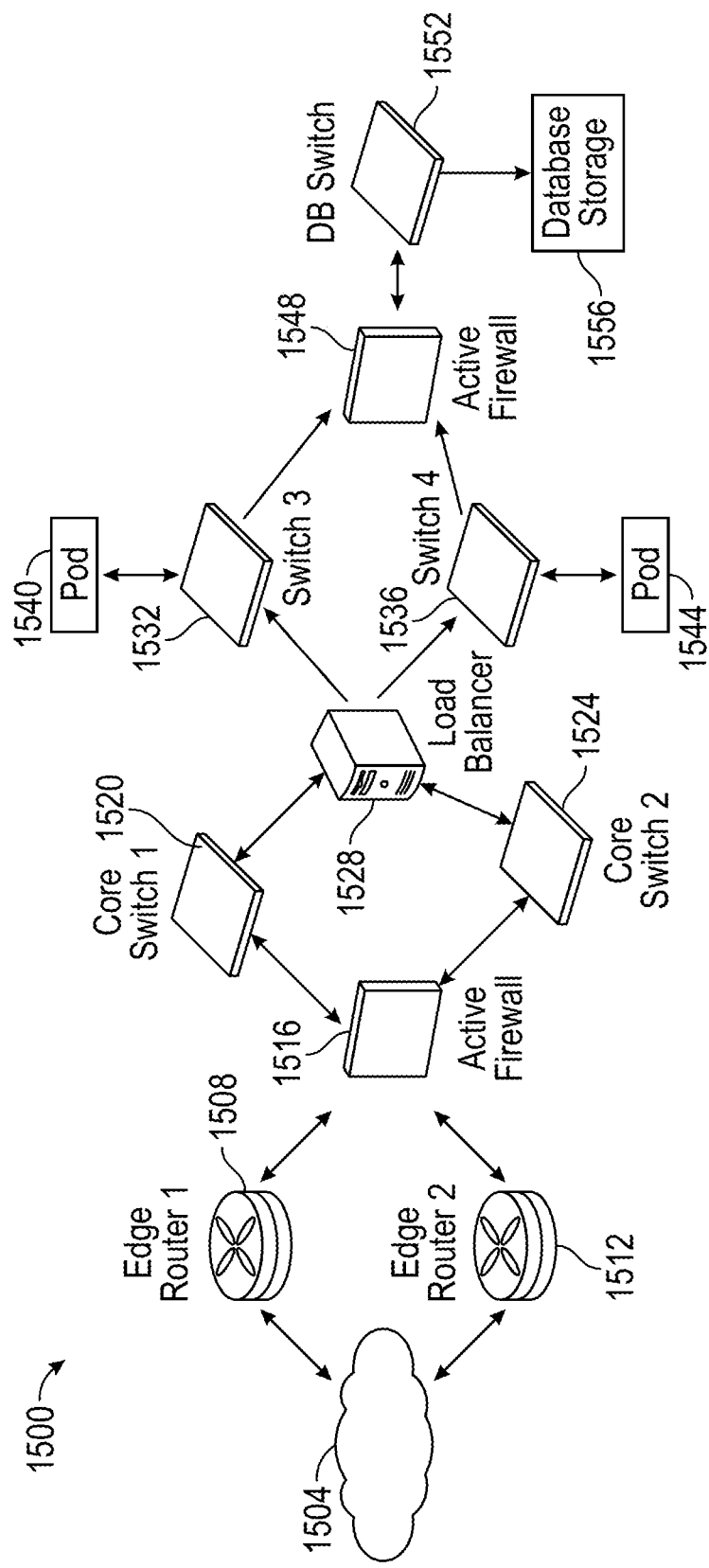
FIG. 15A shows a system diagram of example architectural components of an on-demand database service environment according to some embodiments.

FIG. 15A shows a system diagram illustrating example architectural components of an on-demand database service environment 1500 according to some implementations. A client machine communicably connected with the cloud 1504, generally referring to one or more networks in combination, as described herein, can communicate with the on-demand database service environment 1500 via one or more edge routers 1508 and 1512. A client machine can be any of the examples of user systems 12 described above. The edge routers can communicate with one or more core switches 1520 and 1524 through a firewall 1516. The core switches can communicate with a load balancer 1528, which can distribute server load over different pods, such as the pods 1540 and 1544. The pods 1540 and 1544, which can each include one or more servers or other computing resources, can perform data processing and other operations used to provide on-demand services. Communication with the pods can be conducted via pod switches 1532 and 1536. Components of the on-demand database service environment can communicate with database storage 1556 through a database firewall 1548 and a database switch 1552.

Figure 15B:
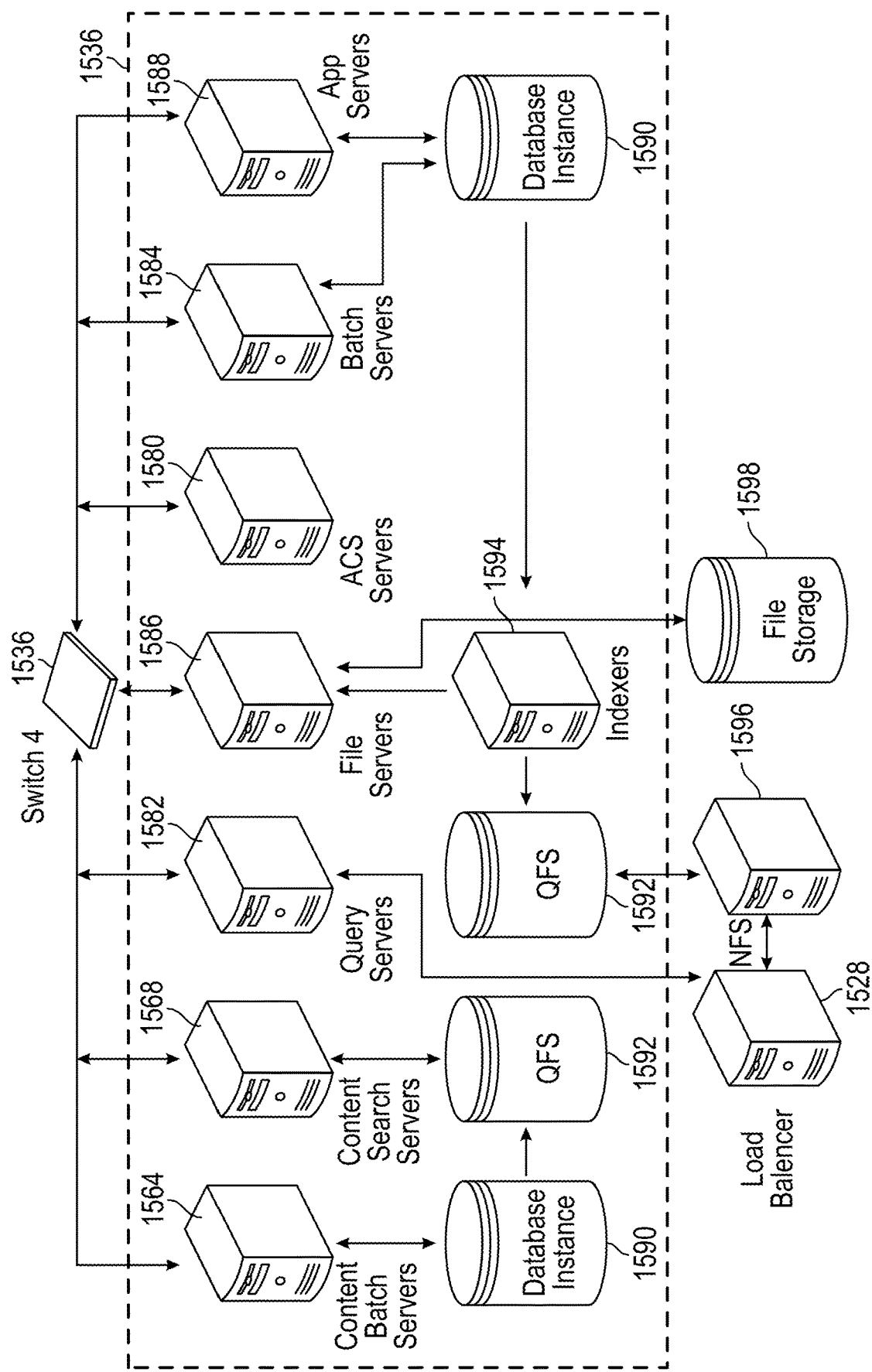
FIG. 15B shows a system diagram further illustrating example architectural components of an on-demand database service environment according to some embodiments.

As shown in FIGS. 15A and 15B, accessing an on-demand database service environment can involve communications transmitted among a variety of different hardware or software components. Further, the on-demand database service environment 1500 is a simplified representation of an actual on-demand database service environment. For example, while only one or two devices of each type are shown in FIGS. 15A and 15B, some implementations of an on-demand database service environment can include anywhere from one to several devices of each type. Also, the on-demand database service environment need not include each device shown in FIGS. 15A and 15B, or can include additional devices not shown in FIGS. 15A and 15B.

Additionally, it should be appreciated that one or more of the devices in the on-demand database service environment 1500 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1504 is intended to refer to a data network or multiple data networks, often including the Internet. Client machines communicably connected with the cloud 1504 can communicate with other components of the on-demand database service environment 1500 to access services provided by the on-demand database service environment. For example, client machines can access the on-demand database service environment to retrieve, store, edit, or process information. In some implementations, the edge routers 1508 and 1512 route packets between the cloud 1504 and other components of the on-demand database service environment 1500. For example, the edge routers 1508 and 1512 can employ the Border Gateway Protocol (BGP). The BGP is the core routing protocol of the Internet. The edge routers 1508 and 1512 can maintain a table of IP networks or 'prefixes', which designate network reachability among autonomous systems on the Internet.

In some implementations, the firewall 1516 can protect the inner components of the on-demand database service environment 1500 from Internet traffic. The firewall 1516 can block, permit, or deny access to the inner components of the on-demand database service environment 1500 based upon a set of rules and other criteria. The firewall 1516 can act as one or more of a packet filter, an application gateway, a stateful filter, a proxy server, or any other type of firewall.

In some implementations, the core switches 1520 and 1524 are high-capacity switches that transfer packets within the on-demand database service environment 1500. The core switches 1520 and 1524 can be configured as network bridges that quickly route data between different components within the on-demand database service environment. In some implementations, the use of two or more core switches 1520 and 1524 can provide redundancy or reduced latency.

In some implementations, the pods 1540 and 1544 perform the core data processing and service functions provided by the on-demand database service environment. Each pod can include various types of hardware or software computing resources. An example of the pod architecture is discussed in greater detail with reference to FIG. 15B. In some implementations, communication between the pods 1540 and 1544 is conducted via the pod switches 1532 and 1536.

The pod switches 1532 and 1536 can facilitate communication between the pods 1540 and 1544 and client machines communicably connected with the cloud 1504, for example via core switches 1520 and 1524. Also, the pod switches 1532 and 1536 may facilitate communication between the pods 1540 and 1544 and the database storage 1556. In some implementations, the load balancer 1528 can distribute workload between the pods 1540 and 1544. Balancing the on-demand service requests between the pods can assist in improving the use of resources, increasing throughput, reducing response times, or reducing overhead. The load balancer 1528 may include multilayer switches to analyze and forward traffic.

In some implementations, access to the database storage 1556 is guarded by a database firewall 1548. The database firewall 1548 can act as a computer application firewall operating at the database application layer of a protocol stack. The database firewall 1548 can protect the database storage 1556 from application attacks such as structure query language (SQL) injection, database rootkits, and unauthorized information disclosure. In some implementations, the database firewall 1548 includes a host using one or more forms of reverse proxy services to proxy traffic before passing it to a gateway router. The database firewall 1548 can inspect the contents of database traffic and block certain content or database requests. The database firewall 1548 can work on the SQL application level atop the TCP/IP stack, managing applications' connection to the database or SQL management interfaces as well as intercepting and enforcing packets traveling to or from a database network or application interface.

In some implementations, communication with the database storage 1556 is conducted via the database switch 1552. The multi-tenant database storage 1556 can include more than one hardware or software components for handling database queries. Accordingly, the database switch 1552 can direct database queries transmitted by other components of the on-demand database service environment (for example, the pods 1540 and 1544) to the correct components within the database storage 1556. In some implementations, the database storage 1556 is an on-demand database system shared by many different organizations as described above with reference to FIG. 13 and FIG. 14.

15 FIG. 15B shows a system diagram further illustrating example architectural components of an on-demand database service environment according to some implementations. The pod 1544 can be used to render services to a user of the on-demand database service environment 1500. In some implementations, each pod includes a variety of servers or other systems. The pod 1544 includes one or more content batch servers 1564, content search servers 1568, query servers 1582, file force servers 1586, access control system (ACS) servers 1580, batch servers 1584, and app servers 1588. The pod 1544 also can include database instances 1590, quick file systems (QFS) 1592, and indexers 1594. In some implementations, some or all communication between the servers in the pod 1544 can be transmitted via the switch 1536.

In some implementations, the app servers 1588 include a hardware or software framework dedicated to the execution of procedures (for example, programs, routines, scripts) for supporting the construction of applications provided by the on-demand database service environment 1500 via the pod 1544. In some implementations, the hardware or software framework of an app server 1588 is configured to execute operations of the services described herein, including performance of the blocks of various methods or processes described herein. In some alternative implementations, two or more app servers 1588 can be included and cooperate to perform such methods, or one or more other servers described herein can be configured to perform the disclosed methods.

The content batch servers 1564 can handle requests internal to the pod. Some such requests can be long-running or not tied to a particular customer. For example, the content batch servers 1564 can handle requests related to log mining, cleanup work, and maintenance tasks. The content search servers 1568 can provide query and indexer functions. For example, the functions provided by the content search servers 1568 can allow users to search through content stored in the on-demand database service environment. The file force servers 1586 can manage requests for information stored in the File force storage 1598. The File force storage 1598 can store information such as documents, images, and basic large objects (BLOBs). By managing requests for information using the file force servers 1586, the image footprint on the database can be reduced. The query servers 1582 can be used to retrieve information from one or more file storage systems. For example, the query system 1582 can receive requests for information from the app servers 1588 and transmit information queries to the NFS 1596 located outside the pod.

The pod 1544 can share a database instance 1590 configured as a multi-tenant environment in which different organizations share access to the same database. Additionally, services rendered by the pod 1544 may call upon various hardware or software resources. In some implementations, the ACS servers 1580 control access to data, hardware resources, or software resources. In some implementations, the batch servers 1584 process batch jobs, which are used to run tasks at specified times. For example, the batch servers 1584 can transmit instructions to other servers, such as the app servers 1588, to trigger the batch jobs.

In some implementations, the QFS 1592 is an open source file storage system available from Sun Microsystems® of Santa Clara, Calif. The QFS can serve as a rapid-access file storage system for storing and accessing information available within the pod 1544. The QFS 1592 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1568 or indexers 1594 to identify, retrieve, move, or update data stored in the network file storage systems 1596 or other storage systems.

In some implementations, one or more query servers 1582 communicate with the NFS 1596 to retrieve or update information stored outside of the pod 1544. The NFS 1596 can allow servers located in the pod 1544 to access information to access files over a network in a manner similar to how local storage is accessed. In some implementations, queries from the query servers 1582 are transmitted to the NFS 1596 via the load balancer 1528, which can distribute resource requests over various resources available in the on-demand database service environment. The NFS 1596 also can communicate with the QFS 1592 to update the information stored on the NFS 1596 or to provide information to the QFS 1592 for use by servers located within the pod 1544.

In some implementations, the pod includes one or more database instances 1590. The database instance 1590 can transmit information to the QFS 1592. When information is transmitted to the QFS, it can be available for use by servers within the pod 1544 without using an additional database call. In some implementations, database information is transmitted to the indexer 1594. Indexer 1594 can provide an index of information available in the database 1590 or QFS 1592. The index information can be provided to file force servers 1586 or the QFS 1592.

Figure 16:
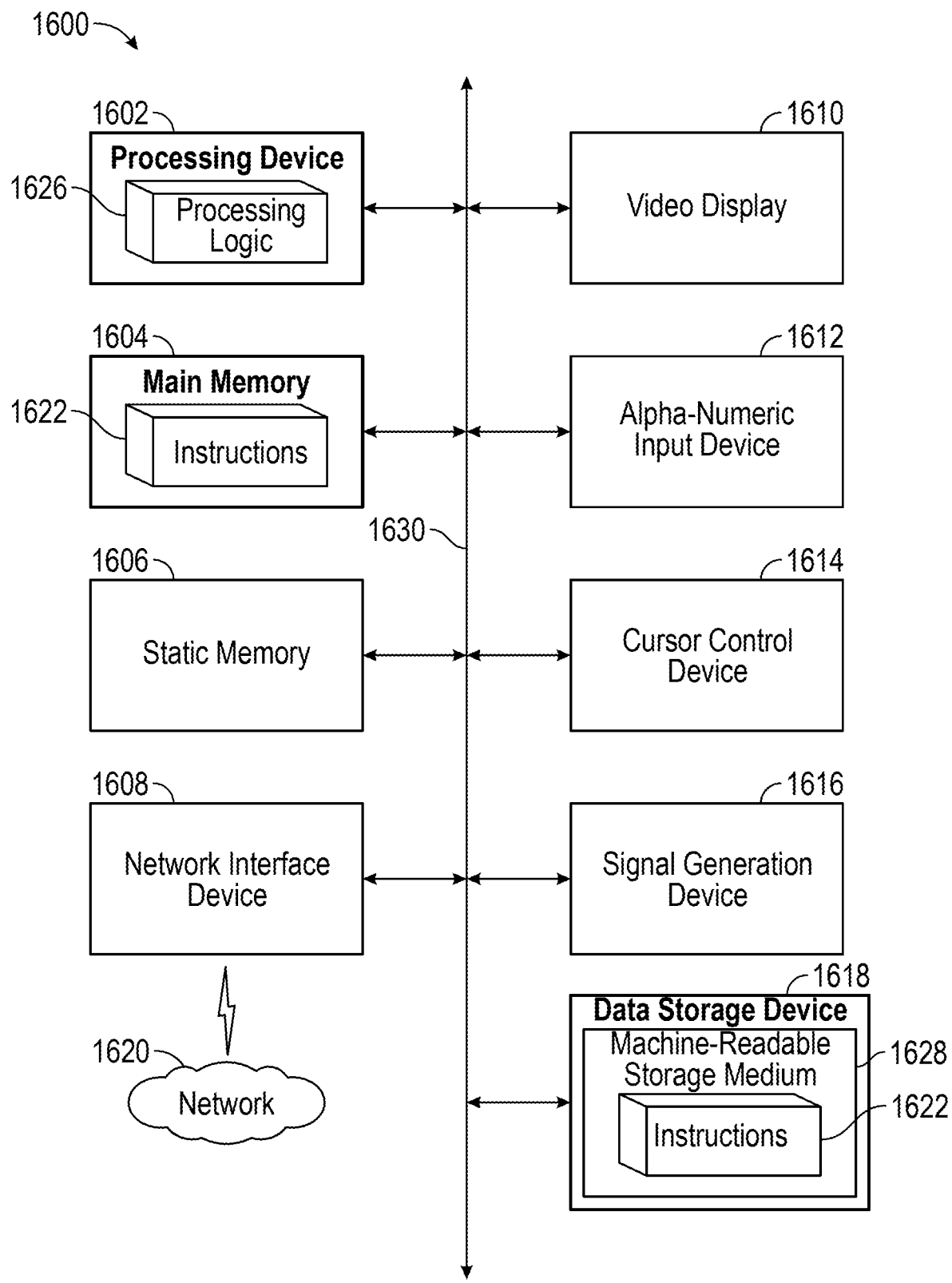
FIG. 16 is a block diagram illustrating an exemplary computer system, according to an embodiment.

FIG. 16 illustrates a diagrammatic representation of a machine in the exemplary form of a computer system 1600 within which a set of instructions, for causing the machine to perform any one or more of the methodologies discussed herein, may be executed. The system 1600 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1600 may represent application server 110, as shown in FIGS. 2-4 and 6.

The exemplary computer system 1600 includes a processing device (processor) 1602, a main memory 1604 (e.g., read-only memory (ROM), flash memory, dynamic random access memory (DRAM) such as synchronous DRAM (SDRAM)), a static memory 1606 (e.g., flash memory, static random access memory (SRAM)), and a data storage device 1618, which communicate with each other via a bus 1630.

Processing device 1602 represents one or more general-purpose processing devices such as a microprocessor, central processing unit, or the like. More particularly, the processing device 1602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1602 may also be one or more special-purpose processing devices such as an application specific integrated circuit (ASIC), a field programmable gate array (FPGA), a digital signal processor (DSP), network processor, or the like.

The computer system 1600 may further include a network interface device 1608. The computer system 1600 also may include a video display unit 1610 (e.g., a liquid crystal display (LCD) or a cathode ray tube (CRT)), an alphanumeric input device 1612 (e.g., a keyboard), a cursor control device 1614 (e.g., a mouse), and a signal generation device 1616 (e.g., a speaker).

The data storage device 1618 may include a computer-readable medium 1628 on which is stored one or more sets of instructions 1622 (e.g., instructions of in-memory buffer service 114) embodying any one or more of the methodologies or functions described herein. The instructions 1622 may also reside, completely or at least partially, within the main memory 1604 and/or within processing logic 1626 of the processing device 1602 during execution thereof by the computer system 1600, the main memory 1604 and the processing device 1602 also constituting computer-readable media. The instructions may further be transmitted or received over a network 1620 via the network interface device 1608.

While the computer-readable storage medium 1628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed:

1. A system, comprising:
an events producer comprising one or more hardware processors configured to generate events that are part of an events stream;
an alerting system that is configured to run on a server system comprising processing hardware, the alerting system comprising:
a streams transformer comprising: a network of transformation nodes comprising: an input transformation node configured to receive at least some of the events; an output transformation node; and an intermediate transformation node coupled between the input transformation node and the output transformation node, wherein the intermediate transformation node is configured to: determine whether state information for that intermediate transformation node should be updated based on state information for each of the transformation nodes that the intermediate transformation node subscribes to each time a state update is received from at least one of the transformation nodes that the intermediate transformation node subscribes to, and generate a state update when the stored state information for each of the transformation nodes that the intermediate transformation node subscribes to collectively indicates that the state update should be generated,
wherein the output transformation node is configured to: receive state updates from any of the transformation nodes the output transformation node is subscribed to, store each of the state updates as state information, and generate a check result when stored state information for each of the transformation nodes that the output transformation node subscribes to collectively indicates that the check result should be generated, wherein the intermediate transformation node and the output transformation node are both configured to maintain state information for each transformation node that they subscribe to, wherein the state information is updated each time a state update is received from another transformation node; and a state change processor configured to: perform an action when it is determined that the check result should trigger the action; and a consumer system that is configured to consume and react to the action generated by the alerting system.

2. The system of claim 1, wherein the intermediate transformation node subscribes to at least the input transformation node and is configured to receive state updates from at least the input transformation node, and wherein the output transformation node subscribes to at least the intermediate transformation node and is configured to receive state updates from at least the intermediate transformation node.

3. The system of claim 2, wherein the input transformation node comprises:

an input connector that is configured to receive the events stream from the events producer that the input transformation node subscribes to, wherein the events stream includes time series of events received from the events producer, wherein each event represents something that has happened; and a transformation rule, for that input transformation node, that is configured to:

process the events and compute state information for the input transformation node in accordance with the transformation rule, and provide state updates that indicate the state information to all transformation nodes that subscribe to the input transformation node.

4. The system of claim 1, wherein each of the intermediate transformation nodes, comprises:

a state module for each transformation node that the intermediate transformation node subscribes to, wherein each state module is configured to: receive state updates from any of the transformation nodes that the intermediate transformation node is subscribed to; store each of the state updates as state information; and update state information for each transformation node that the intermediate transformation node is connected to each time a state update is received from another transformation node that the intermediate transformation node is connected to.

5. The system of claim 4, wherein each state module comprises:

a memory element that stores current state information for a particular transformation node that the intermediate transformation node subscribes to; and a state updater that is configured to:

receive state updates from the particular transformation node;

compare, each time a state update is received, new state information that is indicated in the state update with the current state information stored at the memory element; and update the current state information that is stored at the memory element with the new state information that is indicated in the state update.

6. The system of claim 4, wherein each intermediate transformation node further comprises:

a transformation rule for that intermediate transformation node; and a re-computation trigger function for that intermediate transformation node that is configured to: determine, based on current state information stored by each of the state modules for each of the transformation nodes that the intermediate transformation node subscribes to, whether state information for that intermediate transformation node is to be updated only when state information stored by any of the state modules changes each time a state update is received from at least one of the transformation nodes that the intermediate transformation node subscribes to; and call the transformation rule to re-compute the state information for that intermediate transformation node in accordance with the transformation rule, wherein the transformation rule is configured to communicate a state update comprising the re-computed state information to all transformation nodes that subscribe to the intermediate transformation node.

7. The system of claim 6, wherein the transformation rule is a rule that describes how state information for each transformation node that the intermediate transformation node subscribes to is to be transformed into state information for the intermediate transformation node.

8. The system of claim 6, wherein the transformation rule of the intermediate transformation node is defined based on one or more operations.

9. The system of claim 8, wherein the one or more operations that define the transformation rule of the intermediate transformation node comprise at least one of: logical operations; mathematical operations; analytic operations; filter-based operations; buffered operations; or any combination thereof.

10. The system of claim 1, wherein the output transformation node, comprises:

a state module for each transformation node that the output transformation node subscribes to, wherein each state module is configured to: receive state updates from any of the transformation nodes the output transformation node is subscribed to; store each of the state updates as state information; and update state information for each transformation node that the output transformation node is connected to each time a state update is received from another transformation node that the output transformation node is connected to;

a transformation rule; and a re-computation trigger function that is configured to:

determine, based on the current state information stored by each of the state modules when state information stored by any of the state modules changes, whether state information of the output transformation node is to be updated; and call the transformation rule to: re-compute the state information of the output transformation node in accordance with the transformation rule of the output transformation node, and output a check result that corresponds to the re-computed state information, wherein the transformation rule is configured to communicate the check result to the state change processor when the stored state information for each of the transformation nodes that the output transformation node subscribes to collectively indicates that the check result should be generated, wherein the state change processor is further configured to: receive the check results from the output transformation node; determine, each time a check result is received, whether that check result should trigger an action; and then perform the action when it is determined that the check result should trigger the action.

11. The system of claim 1, wherein the state change processor comprises:
a state module that is configured to receive the check result from the transformation rule of the output transformation node; and to store and update check results from the output transformation node each time a check result is received;
an action trigger function configured to: determine whether the check result or the updated check results provided from the state module should trigger an action; and communicate a trigger command when it determines that the check result or the updated check results should trigger the action; and
an action function that performs the action in response to the trigger command.

12. The system of claim 11, wherein the action performed by the action function comprises:
(1) generation and communication of an alert signal or message;
(2) generation and communication of command to trigger an action;
(3) an action triggered from a signal, message or command; or
(4) a call to an application programming interface (API).

13. The system of claim 1, wherein a path that includes the input transformation node, the intermediate transformation node and the output transformation node defines a check performed that produces the check result.

14. A system, comprising:
an events producer comprising one or more hardware processors configured to generate events that are part of an events stream;
an alerting system that is configured to run on a server system comprising processing hardware, the alerting system comprising:
a streams transformer comprising: a network of transformation nodes comprising: a plurality of input transformation nodes each being configured to receive a particular events stream comprising at least some of the events; a plurality of output transformation nodes; and a plurality of intermediate transformation nodes coupled between the input transformation nodes and the output transformation nodes, wherein each of the intermediate transformation nodes and output transformation nodes subscribe to and receive state updates from one or more of the transformation nodes that are part of the network;
wherein each of the intermediate transformation nodes is configured to: determine whether state information for that intermediate transformation node should be updated based on state information for each of the transformation nodes that the intermediate transformation node subscribes to each time a state update is received from at least one of the transformation nodes that the intermediate transformation node subscribes to, and generate a state update when stored state information for the transformation nodes that the intermediate transformation node subscribes to collectively indicates that the state update should be generated,
wherein each of the output transformation nodes is configured to: receive state updates from any of the transformation nodes the output transformation node is subscribed to, store each of the state updates as state information, and generate a check result when the stored state information for each of the transformation nodes that the output transformation node subscribes to collectively indicates that the check result should be generated, wherein each of the intermediate transformation nodes and each of the output transformation nodes are configured to maintain state information for each transformation node that they subscribe to, wherein the state information is updated each time a state update is received from another transformation node; and
a plurality of state change processors each being configured to: perform an action when that state change processor determines, based on a check result received from a corresponding output transformation node, that the check result should trigger the action; and
a consumer system that is configured to consume and react to the action generated by the alerting system.

15. The system of claim 14, wherein the network of transformation nodes comprises a plurality of different paths, wherein each path comprises:
a particular input transformation node, one or more of the intermediate transformation nodes and a particular output transformation node, wherein each path defines a check performed that produces a check result.

16. The system of claim 14, wherein each the input transformation node comprises:
a transformation rule that is configured to: compute state information, based on events received in an events stream from the events producer, and provide state updates that indicate the state information to all transformation nodes that subscribe to that input transformation node, and
wherein each of the intermediate transformation nodes and the output transformation nodes are configured to:
store and update state information for each transformation node that they subscribe to; and
wherein each of the intermediate transformation nodes and output transformation nodes is further configured to:
receive state updates from any of the transformation nodes that each is subscribed to, store each of the state updates as state information, and
determine whether state information for that intermediate transformation node or a check result for that output transformation node should be updated based on state information for each of the transformation nodes that the intermediate transformation node or output transformation node subscribes to, respectively.

17. The system of claim 16, wherein each intermediate transformation node comprises:
a state module for each transformation node that the intermediate transformation node subscribes to, wherein each state module is configured to: receive state updates from any of the transformation nodes that the intermediate transformation node is subscribed to; store each of the state updates as state information; and update state information for each transformation node that the intermediate transformation node is connected to each time a state update is received from another transformation node that the intermediate transformation node is connected to;

a transformation rule for that intermediate transformation node; and a re-computation trigger function for that intermediate transformation node that is configured to:
- determine, based on current state information stored by each of the state modules for each of the transformation nodes that the intermediate transformation node subscribes to, whether state information for that intermediate transformation node is to be updated only when state information stored by any of the state modules changes each time a state update is received from at least one of the transformation nodes that the intermediate transformation node subscribes to; and
- call the transformation rule to re-compute the state information for that intermediate transformation node in accordance with the transformation rule, wherein the transformation rule re-computes the state information when current state information, stored at that intermediate transformation node for transformation nodes that the intermediate transformation node subscribes to, indicates that state information of that intermediate transformation node is to be updated, wherein the transformation rule is configured to communicate a state update comprising the re-computed state information to all transformation nodes that subscribe to the intermediate transformation node, wherein the output transformation node, comprises:
a transformation rule configured to:
- re-compute state information of that intermediate transformation node in accordance with the transformation rule of that output transformation node, wherein the transformation rule re-computes the state information when current state information, stored at that intermediate transformation node for transformation nodes that the intermediate transformation node subscribes to, indicates that state information of that intermediate transformation node is to be updated, and
- communicate a check result to a corresponding state change processor, wherein the check result comprises the re-computed state information.

18. A method performed by an alerting system that is configured to run on a server system comprising processing hardware, wherein the alerting system comprises at least an input transformation node, an output transformation node and a plurality of intermediate transformation nodes coupled between the input transformation node and the output transformation node, wherein each intermediate transformation node and the output transformation node are configured to maintain state information for each transformation node that they subscribe to, wherein the state information is updated each time a state update is received from another transformation node, and wherein each of the intermediate transformation nodes is configured to: determine whether state information for that intermediate transformation node should be updated based on state information for each of the transformation nodes that the intermediate transformation node subscribes to each time a state update is received from at least one of the transformation nodes that the intermediate transformation node subscribes to, and generate a state update when the stored state information for each of the transformation nodes that the intermediate transformation node subscribes to collectively indicates that the state update should be generated, the method comprising:

receiving, at the alerting system from an events producer comprising one or more hardware processors configured to generate events, an events stream comprising at least some of the events;

receiving, at the output transformation node, state updates from any of the transformation nodes the output transformation node is subscribed to, and storing each of the state updates as state information;

generating a check result at the output transformation node when stored state information for each of the transformation nodes that the output transformation node subscribes to collectively indicates that the check result should be generated;

determining at a state change processor whether the check result should trigger an action;

performing the action at the state change processor when it is determined that the check result should trigger the action; and at a consumer system: consuming and reacting to the action generated by the alerting system.

* * * * *